US011505314B2

(12) United States Patent
Tao

(10) Patent No.: US 11,505,314 B2
(45) Date of Patent: Nov. 22, 2022

(54) VERTICAL TAKEOFF AND LANDING AIRCRAFT WITH TILTABLE ROTORS

(71) Applicant: Aurora Flight Sciences Corporation, Manassas, VA (US)

(72) Inventor: Tony Shuo Tao, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 461 days.

(21) Appl. No.: 16/518,080

(22) Filed: Jul. 22, 2019

(65) Prior Publication Data
US 2021/0024208 A1 Jan. 28, 2021

(51) Int. Cl.
*B64C 29/00* (2006.01)
*B64C 11/32* (2006.01)
*B64C 3/38* (2006.01)
*B64D 35/00* (2006.01)
*B64D 27/24* (2006.01)

(52) U.S. Cl.
CPC .......... *B64C 29/0033* (2013.01); *B64C 3/385* (2013.01); *B64C 11/32* (2013.01); *B64D 27/24* (2013.01); *B64D 35/00* (2013.01)

(58) Field of Classification Search
CPC . B64C 29/0033; B64C 29/0016; B64C 27/22; B64C 3/385; B64C 3/38; B64C 3/42
See application file for complete search history.

(56) References Cited

U.S. PATENT DOCUMENTS 10,807,707 B1 * 10/2020 Ter Keurs ................ B64D 9/00
2007/0221780 A1 * 9/2007 Builta ..................... B64C 27/52
244/7 R
2011/0001020 A1 1/2011 Forgac
(Continued)

FOREIGN PATENT DOCUMENTS

CN 1907806 A * 2/2007 ............. B64C 27/24
WO WO-2018004325 A1 * 1/2018 ............. B64C 27/08

*Primary Examiner* — Philip J Bonzell
(74) *Attorney, Agent, or Firm* — Michael Stanley Tomsa; McAndrews, Held & Malloy, Ltd.; Amanda C. Jackson

(57) ABSTRACT

The present disclosure relates to a vertical takeoff and landing (VTOL) aircraft (100) and a propulsion system (600) thereof. The propulsion system (600) comprises a primary rotor (108) configured to couple to an airframe (102) and oriented to generate a vertical thrust relative to the airframe (102), a drivetrain (626) operably coupled to an engine (602) and configured to mechanically drive the primary rotor (108), and a plurality of tiltable secondary rotor assemblies (114) configured to be disposed about the primary rotor (108). The primary rotor (108) comprises a plurality of collective-only variable-pitch blades. Each of the plurality of tiltable secondary rotor assemblies (114) may have a secondary rotor (116) and an electric motor (608) to drive the secondary rotor (116). An electric generator (606) operably coupled to the engine (602) or to the drivetrain (626) may be configured generate electric power for each electric motor (608) of the plurality of tiltable secondary rotor assemblies (114). Each of the plurality of tiltable secondary rotor assemblies (114) is configured to tilt between a vertical configuration (200*b*) and a horizontal configuration (200*a*) as a function of a phase of flight of the VTOL aircraft (100).

20 Claims, 17 Drawing Sheets

(56) References Cited

U.S. PATENT DOCUMENTS

2019/0241260 A1\* 8/2019 Alhussan ............... B64D 35/04
2020/0062386 A1\* 2/2020 Zhang .................... B64C 25/56
2020/0164975 A1\* 5/2020 Robertson .............. B64C 29/00

\* cited by examiner

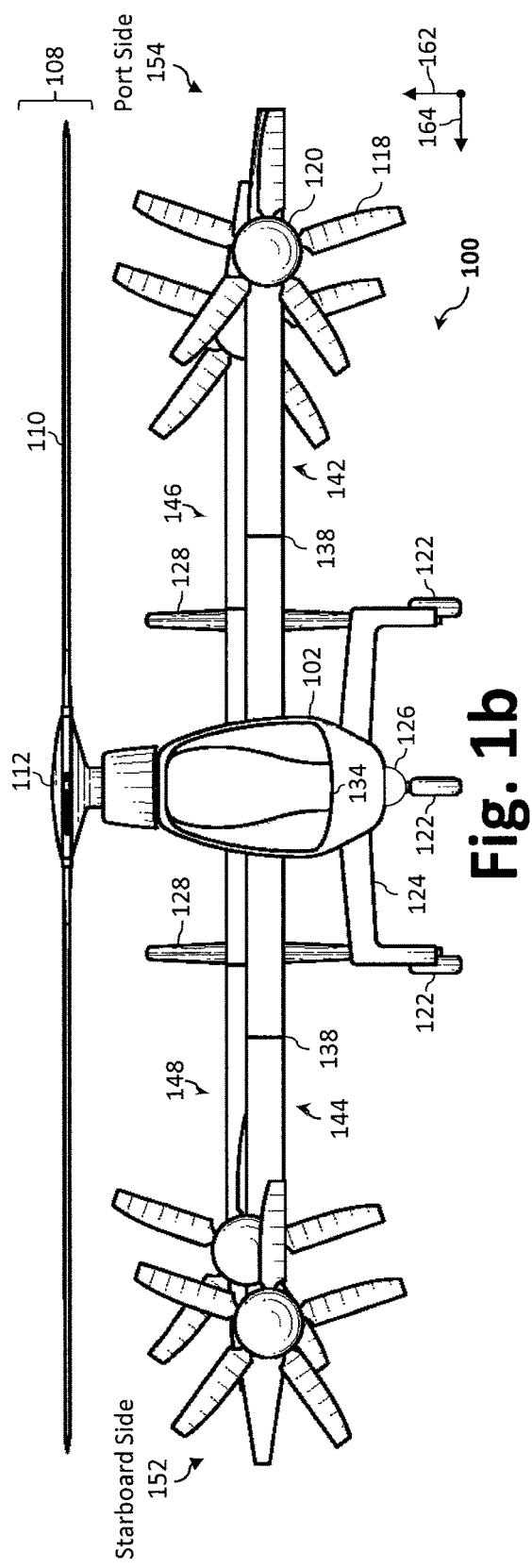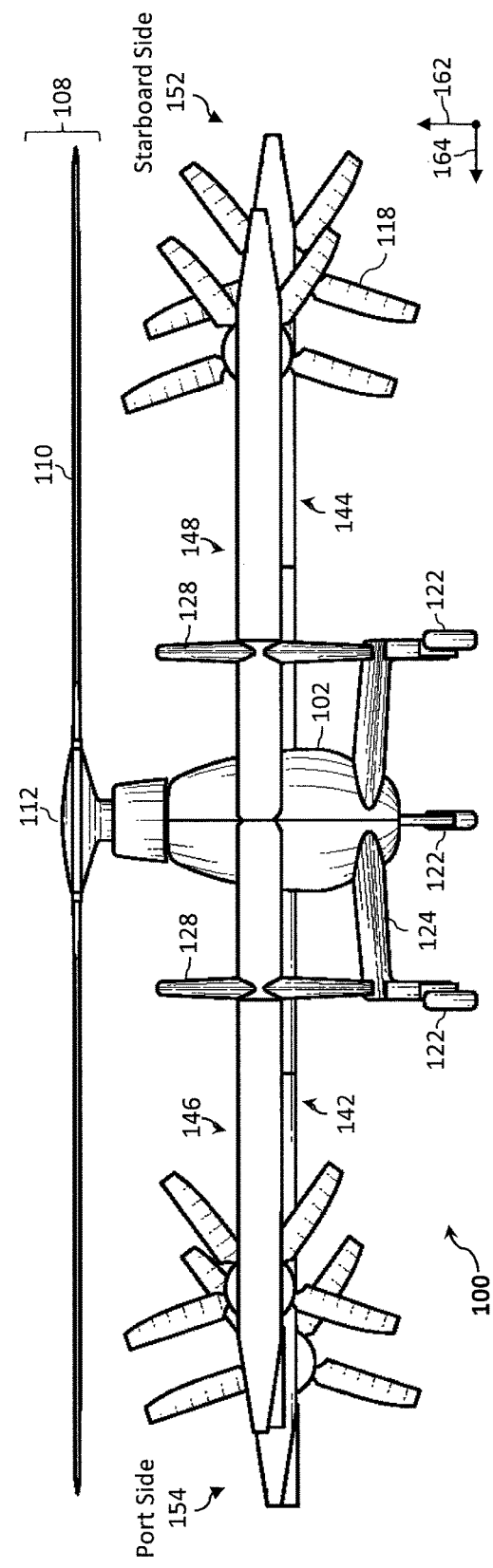

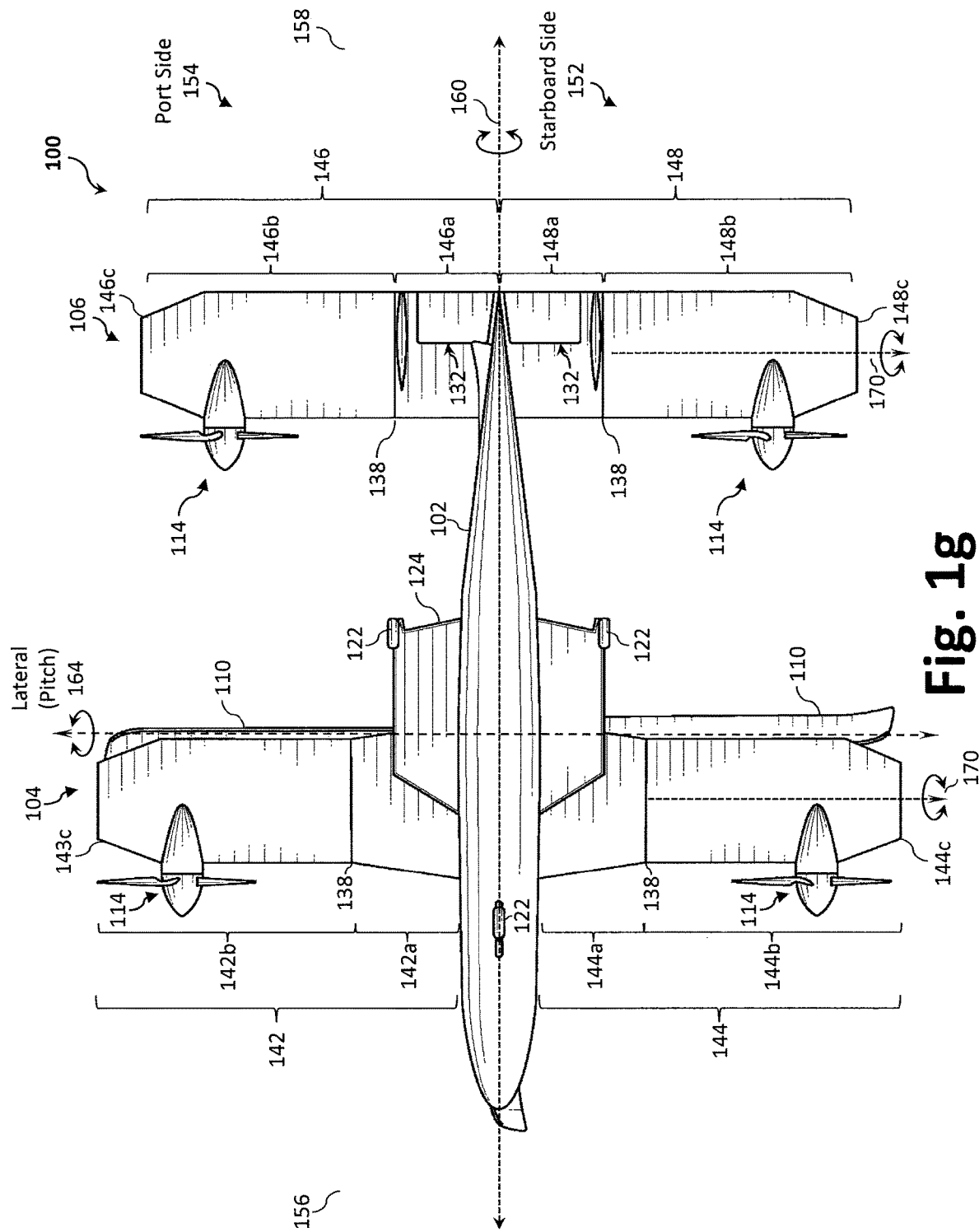

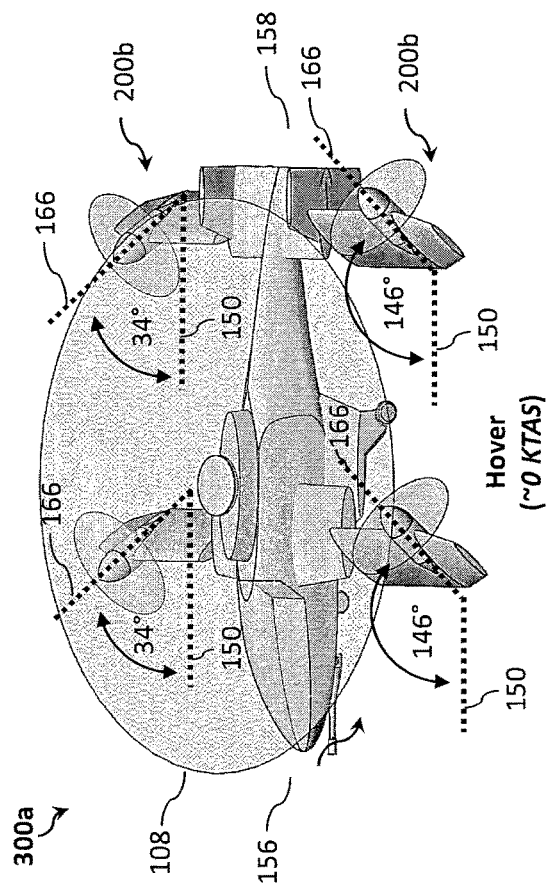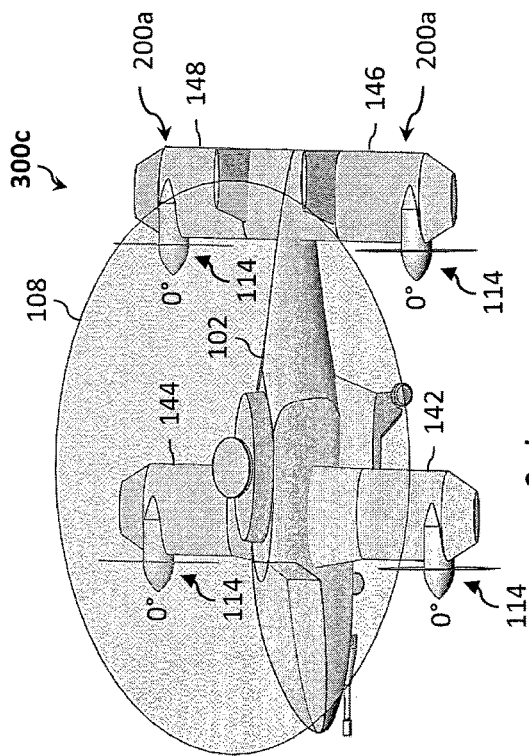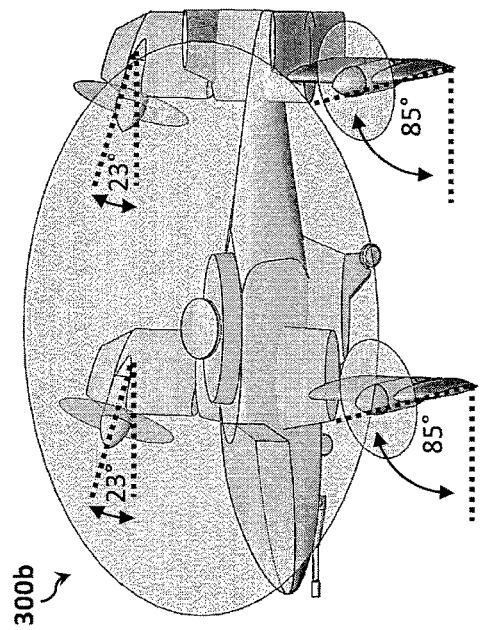

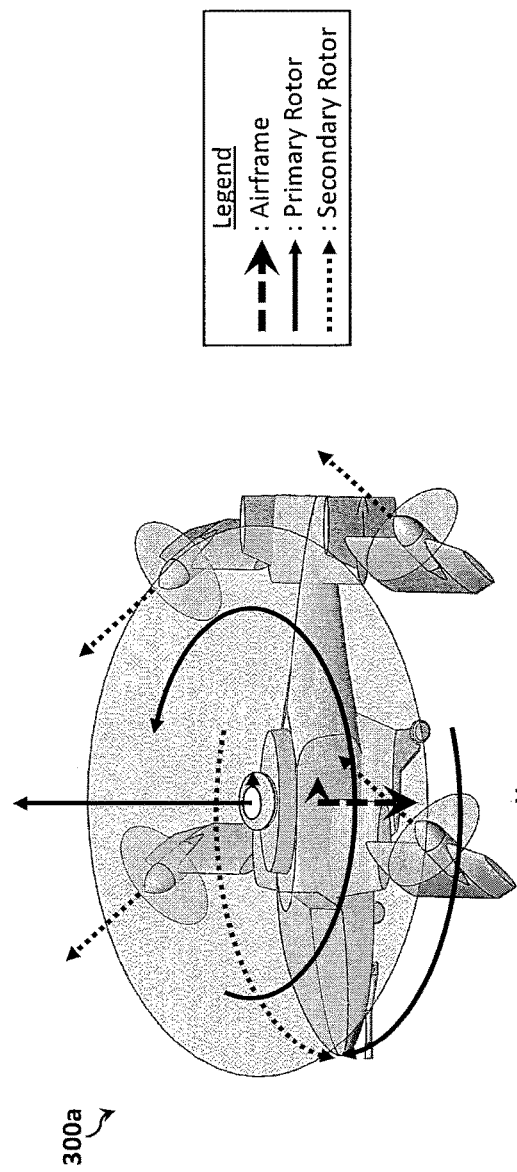
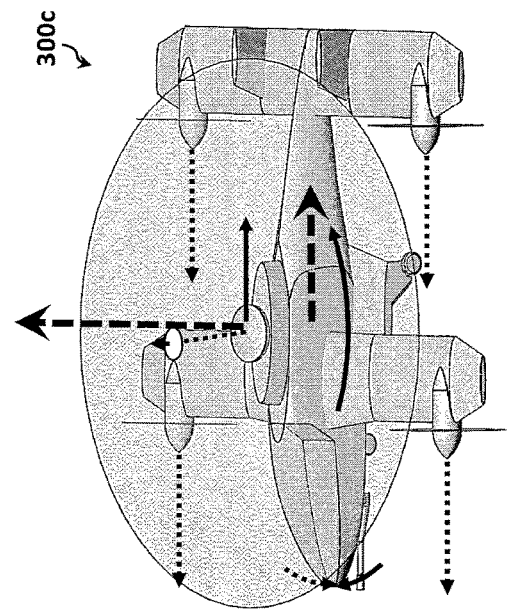
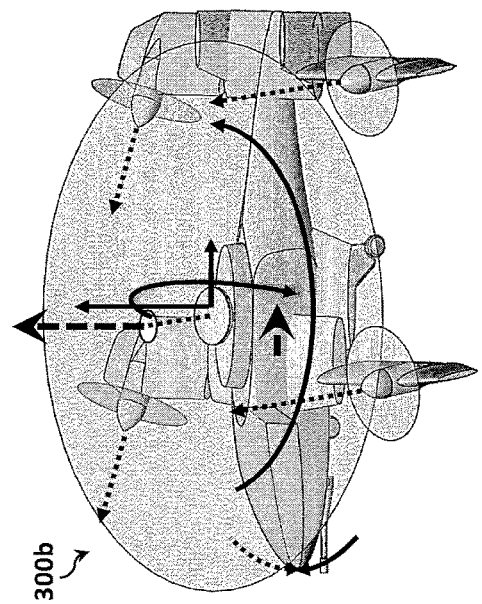
Fig. 4a Hover (~0 KTAS)
Fig. 4b Intermediate (~60 KTAS)
Fig. 4c Cruise (~100+ KTAS)

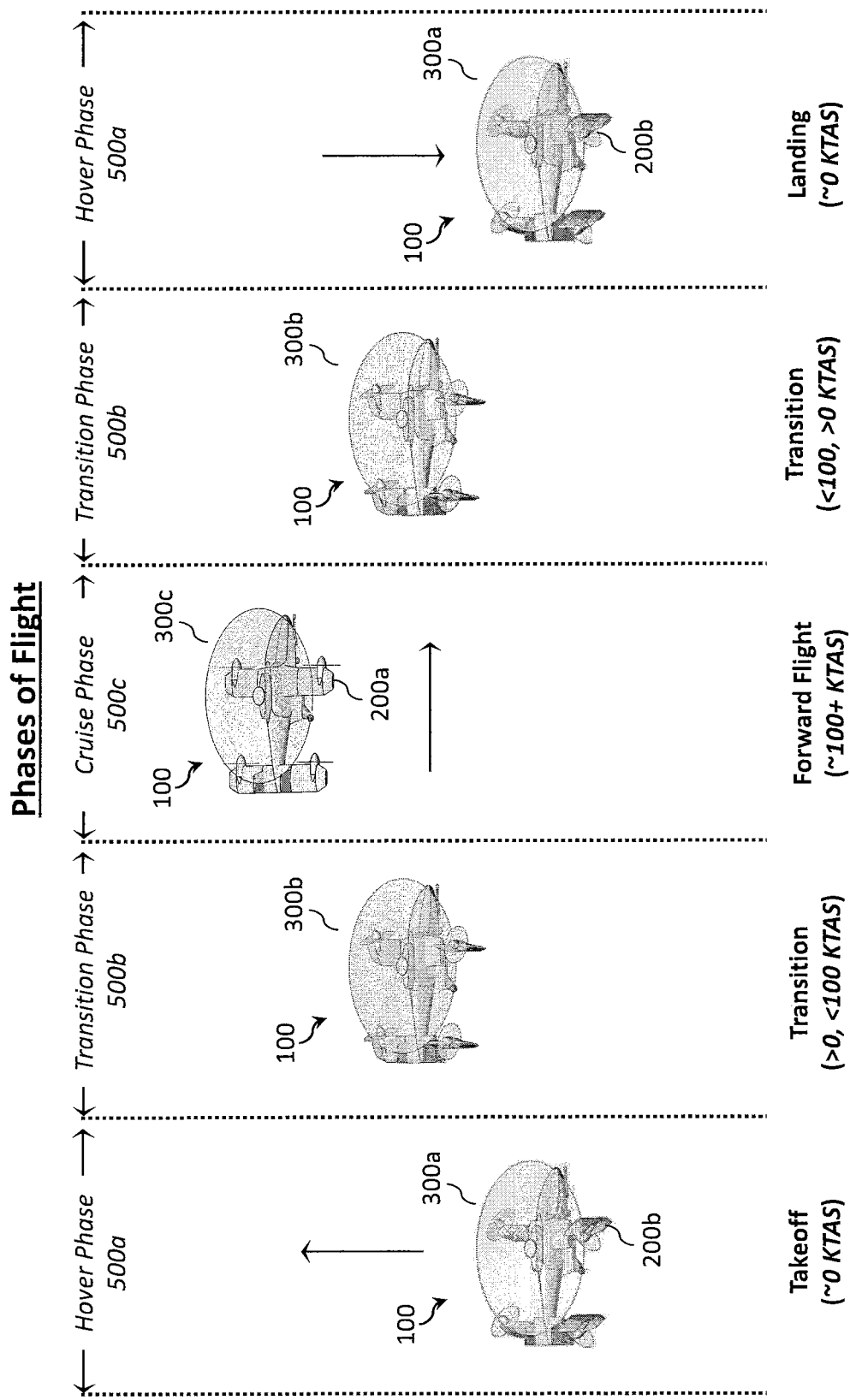

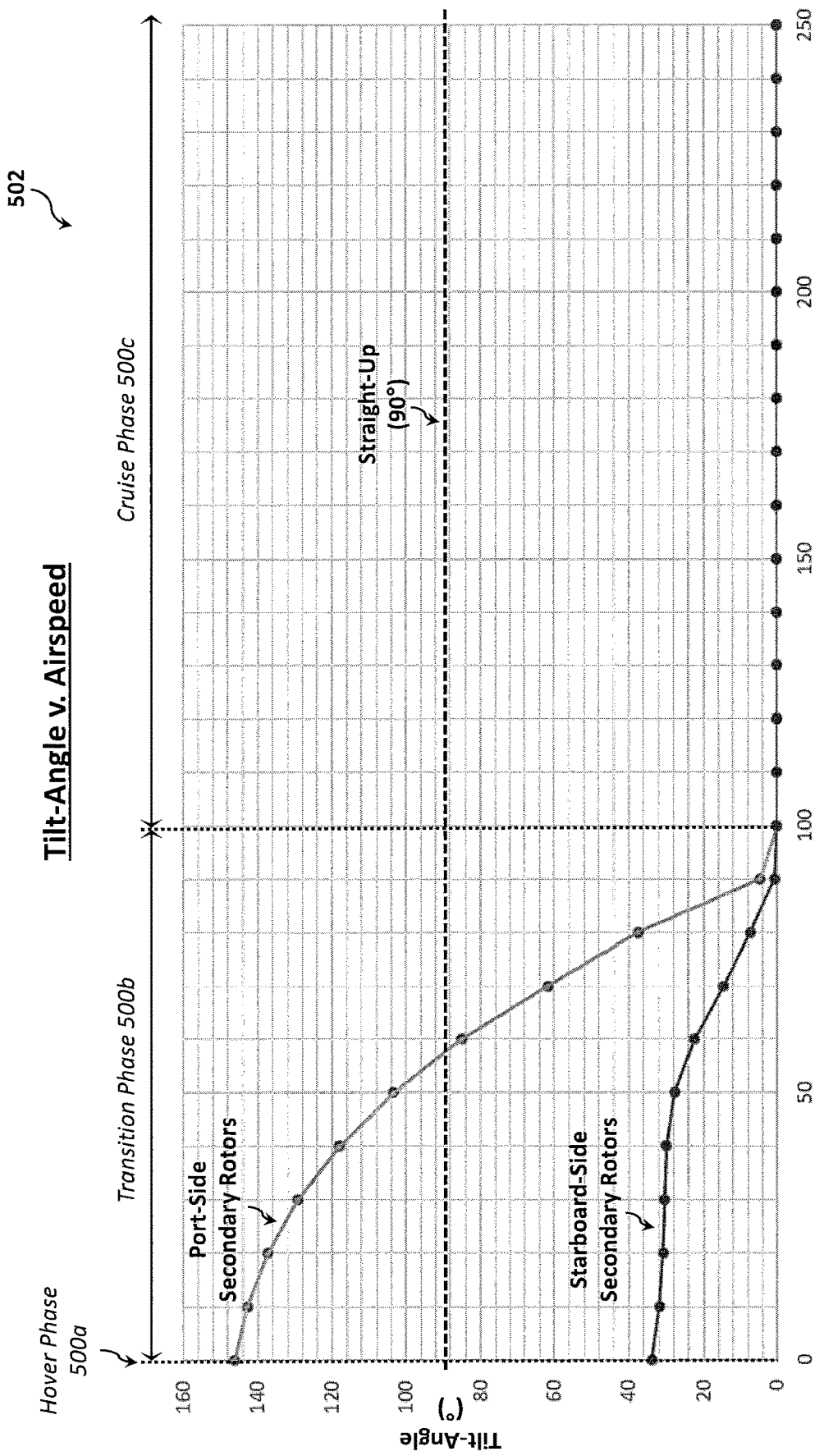

VERTICAL TAKEOFF AND LANDING AIRCRAFT WITH TILTABLE ROTORS

FIELD

The present disclosure relates to a vertical take-off-and-landing (VTOL) aircraft, more particularly, to a VTOL aircraft with a primary rotor and tilting secondary rotor assemblies.

BACKGROUND

There has long been a need for VTOL vehicles that are capable of being deployed from confined spaces. The ability to deploy an aircraft is particularly attractive in situations where a runway is unavailable or inaccessible. Further, many situations favor vehicles that can launch and recover vertically without requiring complex or heavy ground support equipment. Thus, the ability for aircraft to perform VTOL operation is highly valuable for both military and civilian applications, whether a manned or an unmanned aerial vehicle (UAV).

A variety of VTOL aircraft types exist, including fixed-wing aircraft as well as rotorcraft, tiltrotors, and other aircraft with powered rotors. A conventional single-rotor rotorcraft (e.g., helicopters) uses a rotating primary rotor to generate lift and a tail rotor, mounted to a boom, to counter the torque effect of the primary rotor. At least some conventional rotorcraft suffer from disadvantages that can be addressed. First, the stall of the retreating blade of the primary rotor may limit the flight speed of rotorcraft. Second, a spinning primary rotor may be less efficient than a wing, which may cause rotorcraft to be less efficient than other types of aircraft.

Conventional rotorcraft typically use cyclic and collective systems. To overcome the retreating-blade stall limit while preserving VTOL operation, at least some rotorcraft employ either wings or additional rotors. However, existing approaches introduce additional complications, such as the high complexity and mass of the cyclic and collective control systems of coaxial rotors and the high downdraft load of wings. Additional existing solutions to the VTOL and cruise problems involve tilting the rotors or tilting the whole wing such that the same rotor(s) produce(s) both vertical lift and cruise thrust. However, this solution results in competing power and sizing requirements that compromise the performance of the rotors. For example, the rotors are either too small for efficient hover or too large and heavy for efficient cruise.

Addressing these limitations can result in a design that outperforms traditional rotorcraft for cruise-range and cruise-speed important operation. Therefore, a need exists for a VTOL aircraft, a propulsion system thereof, and a method of propelling a VTOL aircraft that overcomes the above-described limitations of traditional rotorcraft, such as flight-speed constraints, cruise efficiency, and maintenance requirements.

SUMMARY

The present disclosure relates to a VTOL aircraft, a propulsion system thereof, and a method for a VTOL aircraft, more particularly, to a VTOL aircraft that addresses top-speed-limit, cruise-efficiency, and high-maintenance problems of traditional rotorcraft through a change of vehicle configuration and control-force-reallocation.

According to a first aspect, a method of operating an aircraft having an airframe, a forward wing set, an aft wing set, and a processor comprises: controlling operation of a primary rotor, via the processor, to provide lift to the airframe during a hover phase, wherein the primary rotor comprises a plurality of synchronous variable-pitch primary blades radially coupled to a primary rotor hub; and controlling each of a plurality of tiltable secondary rotor assemblies, via the processor, to at least partially unload the primary rotor during the hover phase, each of the plurality of tiltable secondary rotor assemblies configured to be disposed on the forward wing set or the aft wing set, wherein each of the plurality of tiltable secondary rotor assemblies is configured to pivot between a vertical configuration and a horizontal configuration to transition the aircraft from a hover configuration to a cruise configuration.

In certain aspects, the method further comprises the step of independently controlling each of the plurality of tiltable secondary rotor assemblies to provide counter-yaw-torque and pitch balance to the aircraft during the hover phase.

In certain aspects, the method further comprises the step of pivoting each of the plurality of tiltable secondary rotor assemblies as a function of its position relative to the primary rotor.

In certain aspects, the method further comprises the step of pivoting controlling each of the plurality of tiltable secondary rotor assemblies to provide pitch and roll control.

In certain aspects, in the hover configuration, (1) at least one of the plurality of tiltable secondary rotor assemblies is oriented to direct thrust downward and forward and (2) at least one of the plurality of tiltable secondary rotor assemblies is oriented to direct thrust downward and aft.

In certain aspects, the secondary rotor of each of the plurality of tiltable secondary rotor assemblies is a variable-pitch rotor, the method further comprising the step of independently adjusting a blade pitch of each of the plurality of tiltable secondary rotor assemblies to achieve a desired thrust.

According to a second aspect, an aircraft comprises: an airframe and a drivetrain coupled to the airframe; a primary rotor coupled to the drivetrain and oriented to generate a vertical thrust relative to the airframe, wherein the primary rotor comprises a plurality of synchronous variable-pitch primary blades; a forward wing set and an aft wing set; and a plurality of tiltable secondary rotor assemblies disposed on the forward wing set and the aft wing set, wherein each of the plurality of tiltable secondary rotor assemblies is configured to tilt between a vertical configuration and a horizontal configuration as a function of an airspeed of the aircraft.

In certain aspects, each of the plurality of tiltable secondary rotor assemblies is arranged in the vertical configuration during a hover phase and configured to partially unload the primary rotor.

In certain aspects, the tiltable secondary rotor assemblies are configured to provide pitch and roll control during the hover phase.

In certain aspects, the tiltable secondary rotor assemblies are configured to provide counter-yaw-torque and pitch and roll balance to the aircraft during the hover phase.

In certain aspects, during the hover phase, (1) at least one of the plurality of tiltable secondary rotor assemblies is oriented to direct thrust downward and forward and (2) at least one of the plurality of tiltable secondary rotor assemblies is oriented to direct thrust downward and aft.

In certain aspects, the plurality of synchronous variable-pitch primary blades provide collective-only control to the primary rotor.

In certain aspects, each of the plurality of tiltable secondary rotor assemblies is arranged in the horizontal configuration during a cruise phase.

In certain aspects, a pitch angle of the plurality of synchronous variable-pitch primary blades is adjusted to 0-degrees during the cruise phase.

In certain aspects, the aircraft further comprises a primary pitch actuator to adjust the pitch angle of the plurality of synchronous variable-pitch primary blades.

In certain aspects, the secondary rotor of each of the plurality of tiltable secondary rotor assemblies is a variable-pitch rotor.

In certain aspects, each variable-pitch rotor of the plurality of tiltable secondary rotor assemblies is independently controllable.

In certain aspects, at least an outboard wing portion of each of the forward wing set and the aft wing set is configured to pivot relative to the airframe to tilt its respective tiltable secondary rotor assembly between the vertical configuration and the horizontal configuration.

According to a third aspect, a propulsion system for an aircraft comprises: a primary rotor configured to couple to a drivetrain and oriented to generate a vertical thrust relative to an airframe, wherein the primary rotor comprises a plurality of synchronous variable-pitch primary blades; a plurality of wing-tilt mechanisms, each of the plurality of wing-tilt mechanisms having a tilt actuator; a plurality of tiltable secondary rotor assemblies configured to be disposed about the primary rotor, wherein each of the plurality of tiltable secondary rotor assemblies is configured to tilt via one of the plurality of wing-tilt mechanisms between a vertical configuration and a horizontal configuration as a function of an airspeed of the aircraft; and an electric generator or an engine configured to generate power necessary to drive either the primary rotor or the plurality of tiltable secondary rotor assemblies.

In certain aspects, the tiltable secondary rotor assemblies are configured to provide pitch and roll control during a hover phase.

DRAWINGS

The foregoing and other objects, features, and advantages of the devices, systems, and methods described herein will be apparent from the following description of particular embodiments thereof, as illustrated in the accompanying figures; where like reference numbers refer to like structures. The figures are not necessarily to scale, emphasis instead being placed upon illustrating the principles of the devices, systems, and methods described herein.

FIG. 1b illustrates a frontal view of the example VTOL aircraft.

FIG. 1c illustrates a rear view of the example VTOL aircraft.

FIG. 1g illustrates a bottom plan view of the example VTOL aircraft.

FIGS. 3a through 3c illustrate, respectively, side elevation views of the example VTOL aircraft in the hover configuration, an intermediate configuration, and the cruise configuration.

FIGS. 4a through 4c illustrate the views of 3a through 3c with an overlay illustrating the forces generated by, or imparted on, the example VTOL aircraft.

FIG. 5a illustrates a diagram of example phases of flight between takeoff and landing.

FIG. 5b illustrates a graph of the tilt-angle of the tiltable secondary rotor assemblies as a function of the airspeed.

DESCRIPTION

Figure 1A:
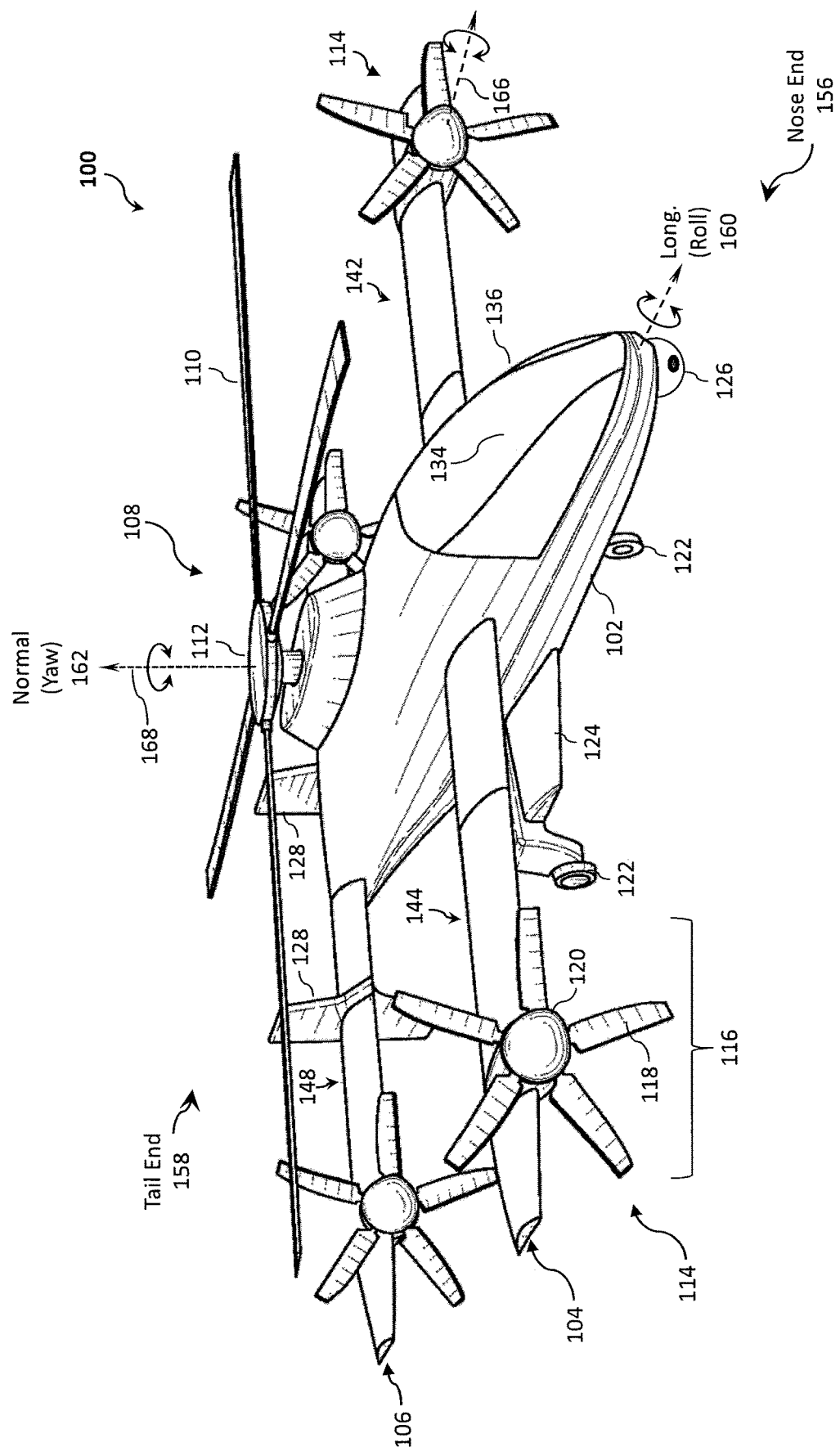
FIG. 1a illustrates a perspective view of an example VTOL aircraft.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the terms "aerial vehicle" and "aircraft" are used interchangeably and refer to a machine capable of flight, including, but not limited to, both traditional runway and VTOL aircraft, and also including both manned and unmanned aerial vehicles. VTOL aircraft may include fixed-wing aircraft, rotorcraft (e.g., helicopters, multirotor, etc.), and/or tilt-rotor/tilt-wing aircraft.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "circuits" and "circuitry" refer to physical electronic components (i.e., hardware) and any software and/or firmware ("code"), which may configure the hardware, be executed by the hardware, and or otherwise be associated with the hardware. For example, a particular processor and memory may comprise a first "circuit" when executing a first one or more lines of code and may comprise a second "circuit" when executing a second one or more lines of code.

As used herein, the term "composite material" refers to a material comprising an additive material and a matrix material. For example, a composite material may comprise a fibrous additive material (e.g., fiberglass, glass fiber ("GF"), carbon fiber ("CF"), aramid/para-aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may include a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

As used herein, the term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

Disclosed herein is a VTOL aircraft capable of achieving higher flight speeds and increased cruise efficiency—i.e., requiring less power from the engine during cruise operation. Generally speaking, the VTOL aircraft separates the lift and control requirements of a conventional single-rotor rotorcraft and reallocates certain control functions (e.g., roll and pitch commands, which would be conventionally achieved with the cyclic.) from the primary rotor to other parts of the VTOL aircraft. As will be described, the disclosed VTOL aircraft includes one or more adaptable wing sets and a plurality of tiltable secondary rotor assemblies. The wing sets provide the necessary lifting force to allow the primary rotor to become unloaded during cruise phase. Whereas the tiltable secondary rotor assemblies, in addition to providing thrust for cruise phase, may be used to control the VTOL aircraft's attitude during the hover phase and transition phase of flight, thereby eliminating the roll moments generated by conventional retreating-blade stall and obviating the need for cyclic control components. In other words, the wings supply lift at high speed such that the main rotor isn't necessary to provide lift. By obviating the need for the main rotor during higher-speed forward flight, retreating blade stall is avoided and the need for cyclic control is obviated.

Compared to conventional rotorcraft, the disclosed VTOL aircraft can achieve higher flight speeds and increased cruise efficiency, while also eliminating many of the high-maintenance and high-cost components typically required by conventional rotorcraft, such as the cyclic control components. The tiltable thrust generated by the tiltable secondary rotor assemblies allows the VTOL aircraft to perform conventional helicopter maneuvers and fly at high speeds. Because the tiltable secondary rotor assemblies only provide a small proportion of the hover lift, design of the tiltable secondary rotor assemblies can be better-matched to the cruise phase, thereby allowing for greater forward-flight efficiency than a conventional helicopter. Further, the removal of cyclic control mechanisms reduces the mass and complexity of the primary rotor. The result is a vehicle that minimizes the primary maintenance-driving components (e.g., shafts, gearboxes, and cyclic control), while producing wing-offset-lift, enabling the vehicle to cruise efficiently.

Figure 1D:
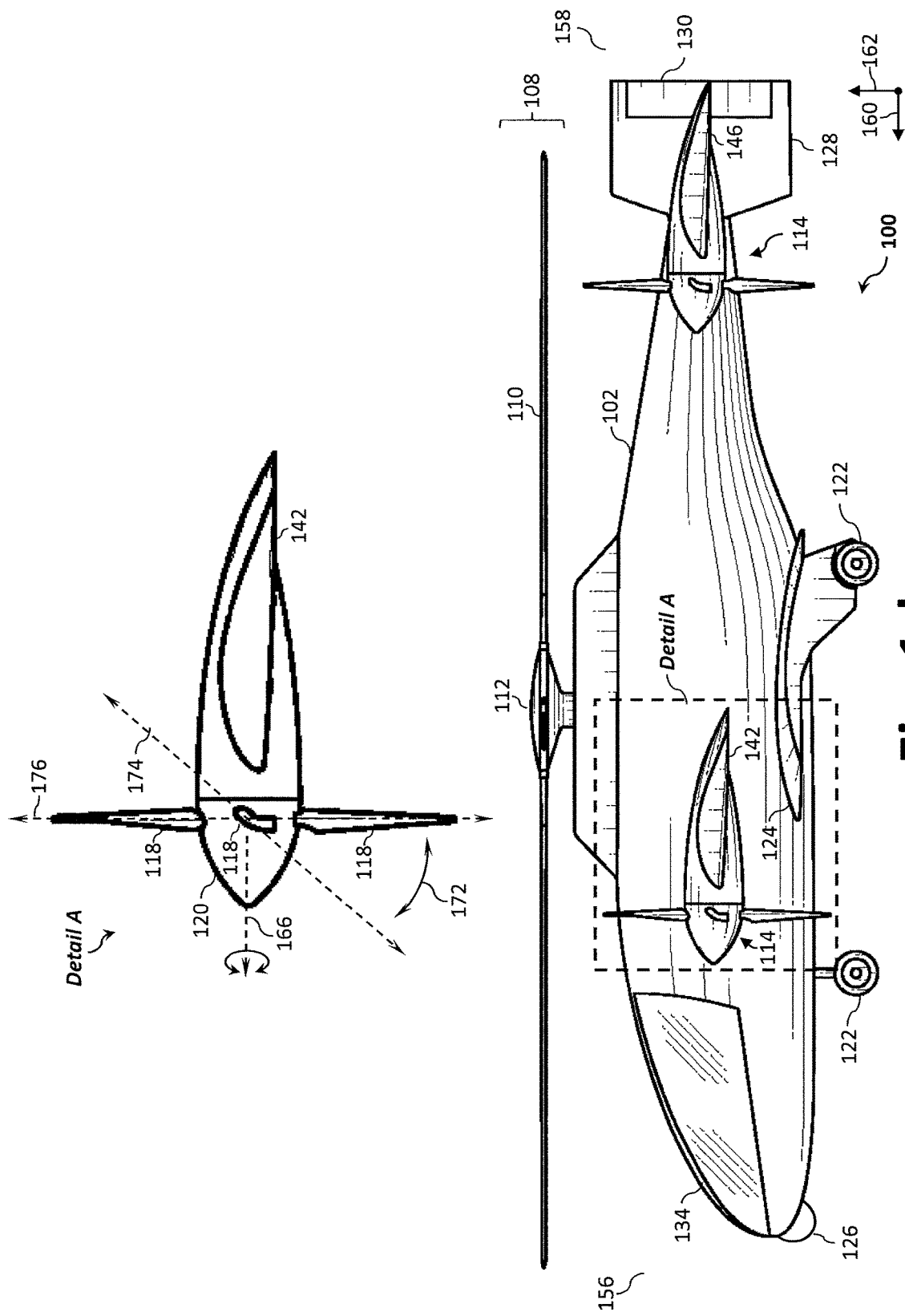
FIG. 1d illustrates a port-side view of the example VTOL aircraft.
Figure 1E:
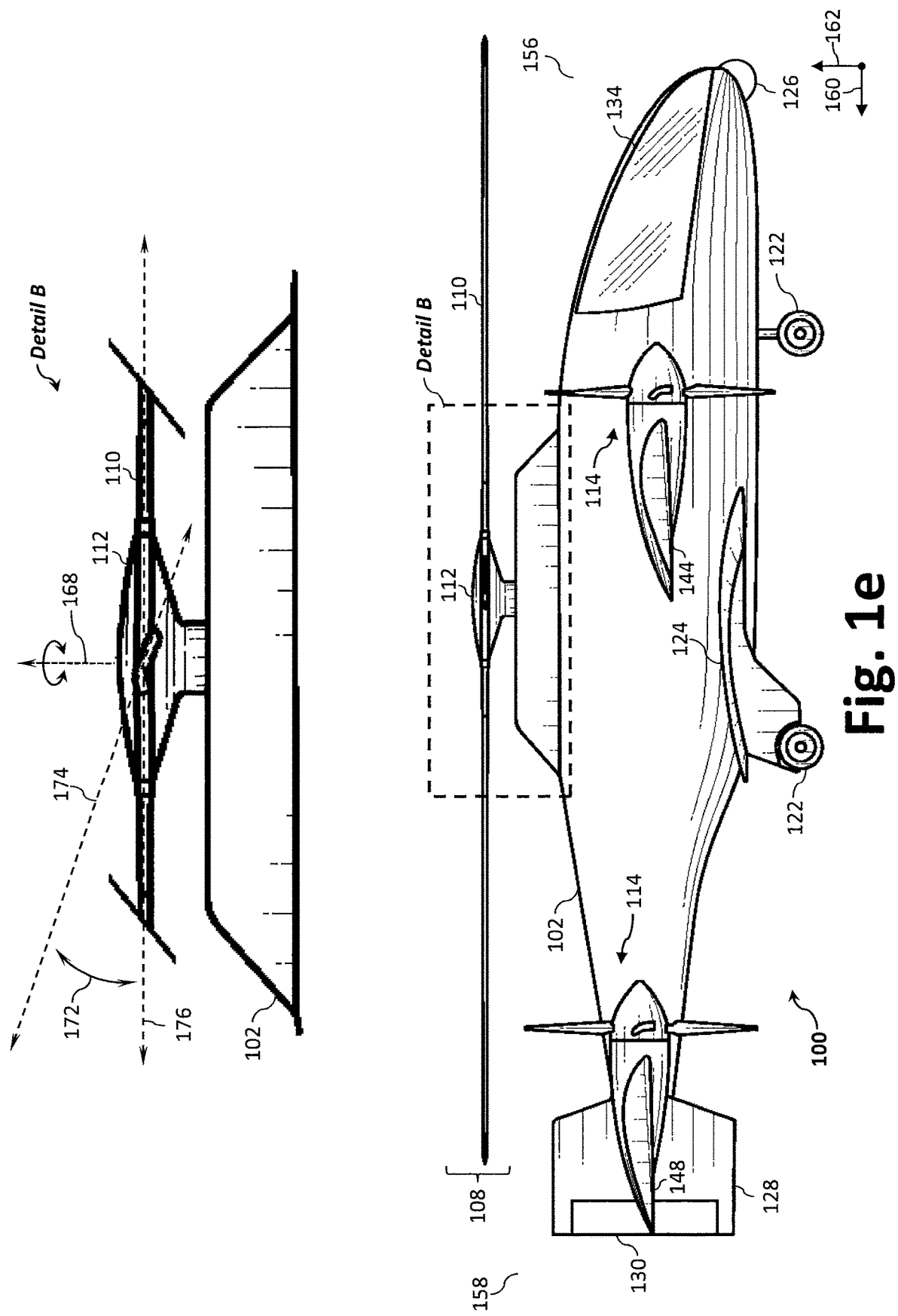
FIG. 1e illustrates a starboard-side view of the example VTOL aircraft.
Figure 1F:
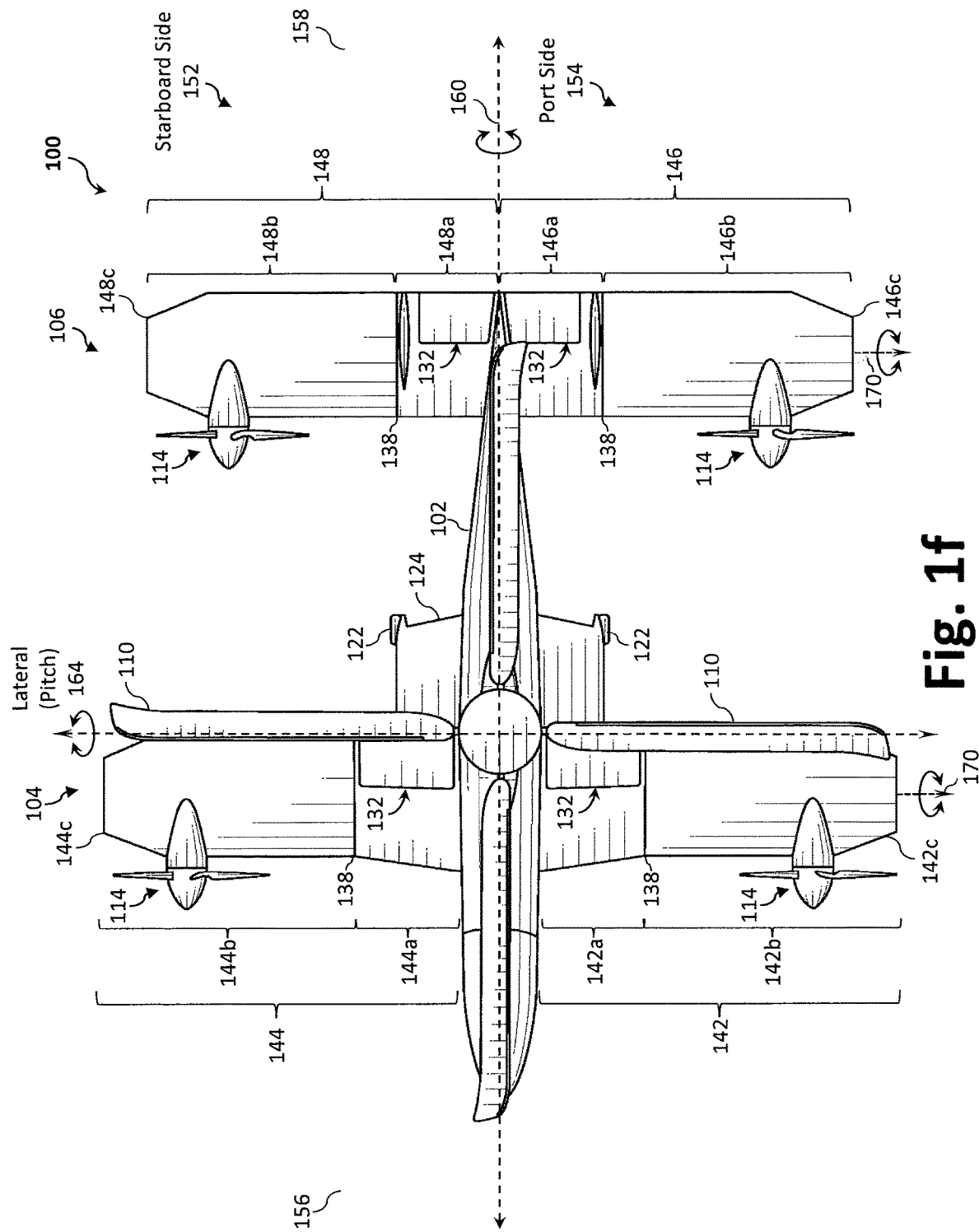
FIG. 1f illustrates a top plan view of the example VTOL aircraft.
Figure 1H:
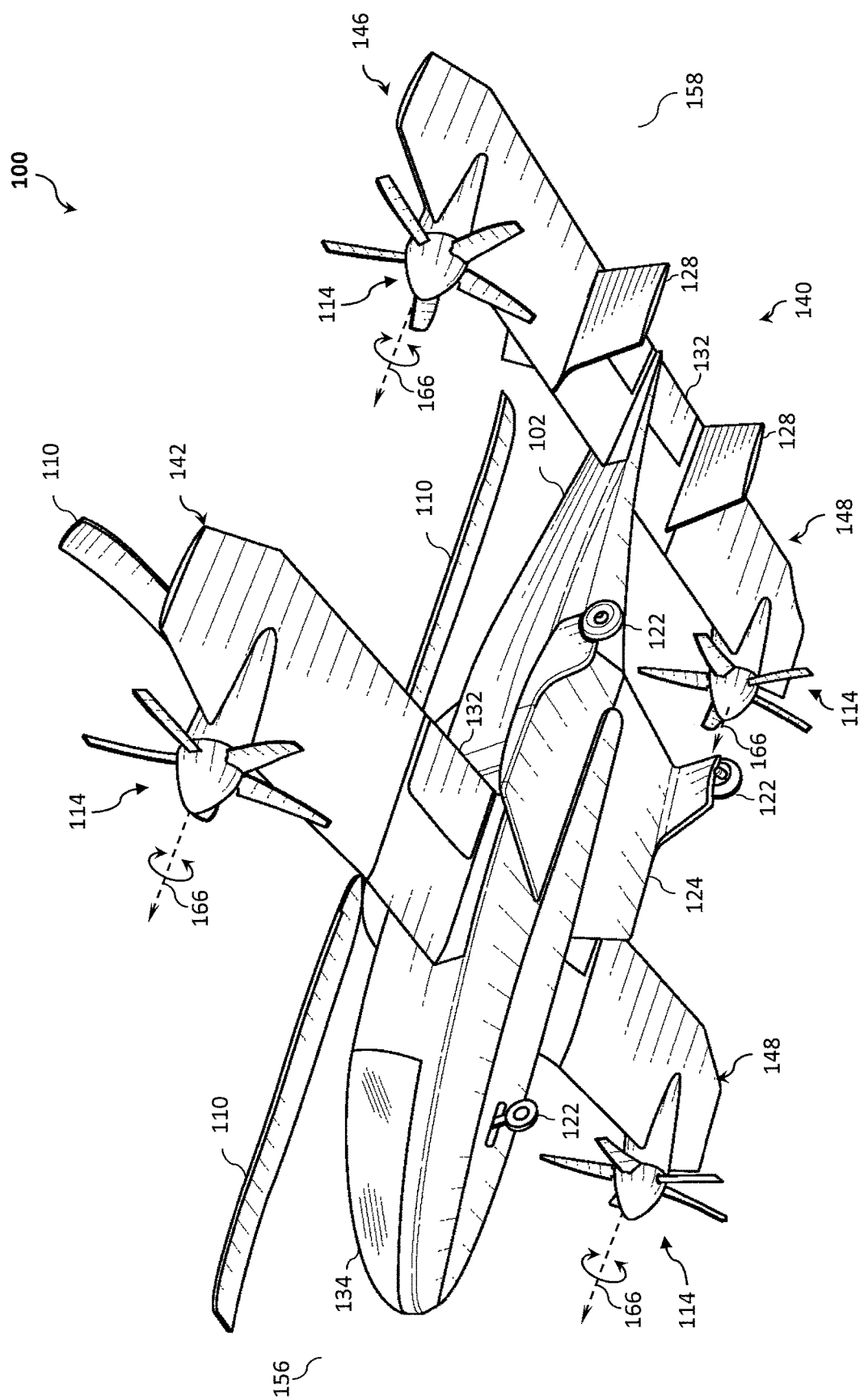
FIG. 1h illustrates an isometric view of the underside of the example VTOL aircraft.
Figure 1I:
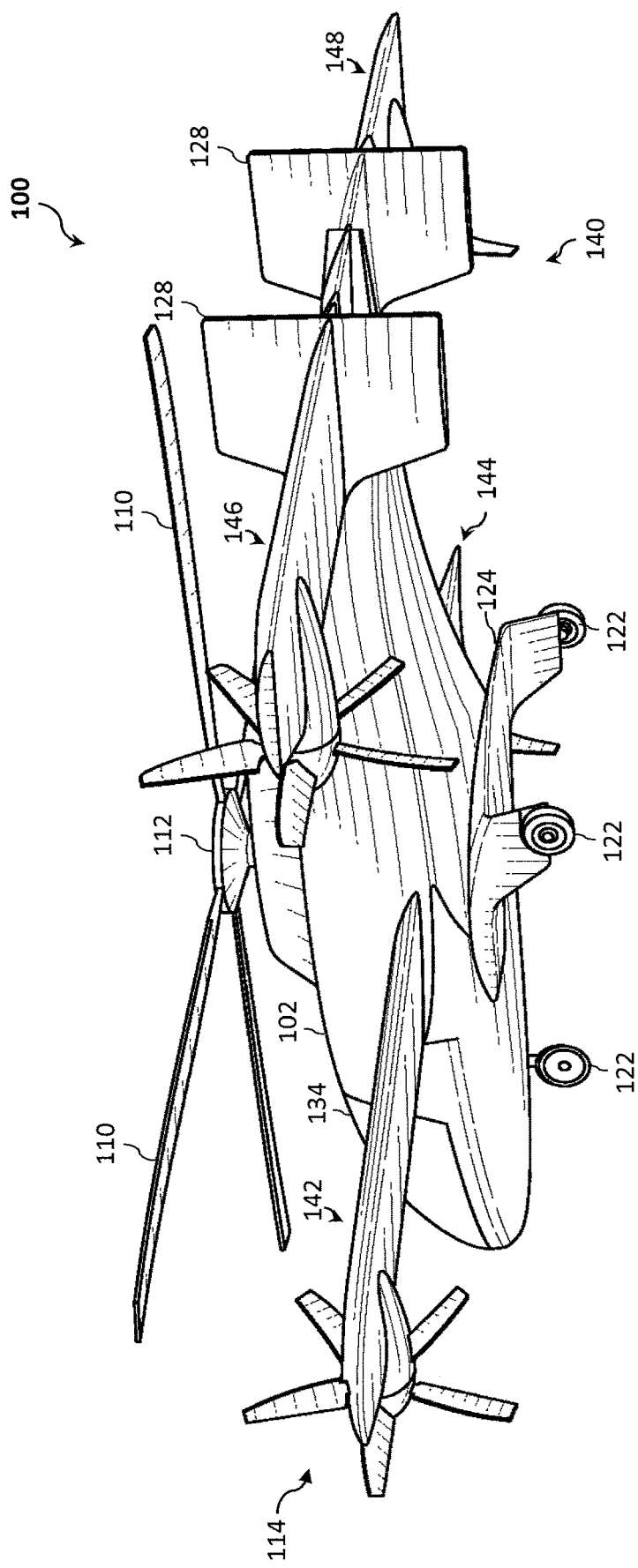
FIG. 1i illustrates a rear perspective view of the example VTOL aircraft.

FIG. 1a through 1i illustrate an example VTOL aircraft 100 in a cruise configuration for a cruise phase of flight. Specifically, FIG. 1a illustrates a perspective view of the VTOL aircraft 100, while FIGS. 1b and 1c illustrate, respectively, front and rear views of the VTOL aircraft 100. FIGS. 1d and 1e illustrate, respectively, port (left) and starboard (right) side views of the VTOL aircraft 100, while FIGS. 1f and 1g illustrate, respectively, top and bottom plan views of the VTOL aircraft 100. Finally, FIGS. 1h and 1i illustrate, respectively, an isometric view of the underside of the VTOL aircraft 100 and a rear perspective view of the VTOL aircraft 100.

With reference to FIGS. 1a, 1f, and 1g, the VTOL aircraft 100 generally comprises an airframe 102 (e.g., a fuselage) having a forward wing set 104 and an aft wing set 106. The forward wing set 104 comprises a port-side forward wing 142 and a starboard-side forward wing 144, while the aft wing set 106 may comprise a port-side aft wing 146 and a starboard-side aft wing 148. The forward wing set 104 and the aft wing set 106 can be arranged in a tandem configuration, as best illustrated in FIGS. 1f and 1g. Each of the port-side forward wing 142, the starboard-side forward wing 144, the port-side aft wing 146, and the starboard-side aft wing 148 comprises a fixed portion and a pivoting portion that is configured to pivot relative to the fixed portion about a wing-pivot axis 170. Specifically, the port-side forward wing 142 comprises a fixed inboard wing portion 142a and a pivoting outboard wing portion 142b that is configured to pivot relative to the fixed inboard wing portion 142a about its wing-pivot axis 170 via, for example, a wing-tilt mechanism 138. Correspondingly, the starboard-side forward wing 144 includes a fixed inboard wing portion 144a and a pivoting outboard wing portion 144b, the port-side aft wing 146 includes a fixed inboard wing portion 146a and a pivoting outboard wing portion 146b, and the starboard-side aft wing 148 includes a fixed inboard wing portion 148a and a pivoting outboard wing portion 148b.

During the cruise phase of flight, the forward wing set 104 and the aft wing set 106 sustain wing-borne flight for the VTOL aircraft 100, thus unloading the primary rotor 108. As will be appreciated by those of ordinary skill in the art, wing-borne flight refers to the type of flight where lift is provided to the aircraft via one or more airfoils (e.g., forward wing set 104 and the aft wing set 106), thereby obviating the need for vertical thrust (e.g., from the primary rotor 108). While the forward wing set 104 and the aft wing set 106 are illustrated as generally linear with non-tapered outboard wing portions 142b, 144b, 146b, 148b (apart from the wingtips 142c, 144c, 146c, 148c, which taper slightly), other wing configurations are contemplated, such as back-swept, tapered, rectangular, elliptical, forward-swept, and the like. Therefore, the forward wing set 104 and the aft wing set 106 may be any type of fixed wing, including, but not limited to, a straight wing, a swept wing, a forward-swept wing, a dihedral wing (an upward angle from horizontal), an anhedral wing (a negative dihedral angle—downward angle from horizontal), or any other suitable type of fixed wing as known by those of ordinary skill in the art.

As shown in FIGS. 1h and 1i, the airframe 102 further includes a tail section 140 at the tail end 158 with one or more vertical stabilizers 128 (e.g., one or more dorsal fins), which, as illustrated, may be substantially perpendicular to the aft wing set 106 to define a twin tail empennage (e.g., an H-tail arrangement, as illustrated, or a U-tail arrangement). While illustrated as a twin tail arrangement, the tail section 140 of the VTOL aircraft 100 may be configured in one of multiple tail configurations, including, for example, airframe mounted, a cruciform, T-tail, a flying tailplane, a pi-tail (i.e., π-tail), a V configuration, an inverted V configuration (i.e., "/\"configuration), etc. In certain aspects, the tail section 140 may be embodied as a combination H- and /\-tail arrangement where the tail section 140 comprises /\-tail surfaces that couple to the aft wing set 106 to provide a combination H- and /\-tail arrangement.

To assist with controlled flight, the VTOL aircraft 100 may include one or more moveable control surfaces. In the illustrated embodiment, the forward wing set 104, the aft wing set 106, and/or the vertical stabilizers 128 may further comprise one or more trailing edge moveable control surfaces. For example, each of the vertical stabilizers 128 may include a fixed leading section and a movable rudder 130 pivotably coupled to a trailing edge of the fixed leading section. The forward wing set 104 and the aft wing set 106 may similarly comprise one or more trailing edge flaps 132 and/or trim tabs. The trailing edge flaps 132 may be coupled with the forward wing set 104 or the aft wing set 106 in accordance with one or more flap configurations, including, for example, plain flaps, slotted flaps, and fowler flaps. The moveable control surfaces may be rotatably and/or hingedly coupled to the VTOL aircraft 100 via one or more hinges to enable them to pivot about an axis defined by the trailing edge of the structure to which the moveable control surface is attached.

The various structural components of the VTOL aircraft 100 may be fabricated from metal, a composite material, wood, plastic, or a combination thereof. In certain aspects, portions of the VTOL aircraft 100 (e.g., the airframe 102, the forward wing set 104, and/or the aft wing set 106) may be fabricated using one or more additive manufacturing/3D printing techniques, such as fused deposition modeling (FDM), stereolithography (SLA), selective laser sintering (SLS), and/or any other suitable type of additive manufacturing/3D printing.

To facilitate hover phase, transition phase, and cruise phase of flight, the VTOL aircraft 100 includes a primary rotor 108 and a plurality of tiltable secondary rotor assemblies 114. The primary rotor 108 is coupled to the airframe 102 and oriented to generate a vertical thrust relative to the airframe 102. The vertical thrust from the primary rotors 108 may be directed downward relative to the airframe 102 to provide lift to the airframe 102 (e.g., during the hover and transition phases). While the primary rotor 108 is illustrated as coupled to the airframe 102, the primary rotor 108 may instead be coupled to other structural components of the aircraft 100 (e.g., the tail section 140, inboard wing portions 142a, 144a, 146a, 148a, etc.). Further, while only a single primary rotor 108 is illustrated, the VTOL aircraft 100 may include two or more primary rotors 108, which may be arranged on the airframe 102 in a tandem configuration.

The primary rotor 108, which has a fixed axis of rotation 168, includes a plurality of variable-pitch primary blades 110 radially coupled to a primary rotor hub 112 (e.g., a collective arrangement). In the illustrated example, the fixed axis of rotation 168 of the primary rotor 108 coincides with the normal (yaw) axis 162 of the aircraft 100. The primary rotor 108 may spin in a clockwise or a counter-clockwise direction (when viewed from overhead) about the fixed axis of rotation 168. With reference to Detail A (FIG. 1d) and Detail B (FIG. 1e), the blade pitch 172 (i.e., blade pitch angle) refers to the angle between the chord 174 of the rotor blade (e.g., variable-pitch primary blade 110, variable-pitch secondary blade 118) and the plane of rotation 176 defined by the rotor (e.g., primary rotor 108, secondary rotor 116).

To reduce cost and complexity, the primary rotor 108 provides collective-only control where the plurality of variable-pitch primary blades 110 are synchronous variable-pitch blades that are configured to pivot (i.e., adjust blade pitch 172) synchronously relative to the primary rotor hub 112. In certain aspects, to further reduce cost and complexity, the primary rotor 108 may include fixed-pitch blades, where vertical thrust is adjusted by increasing or decreasing the rotational speed (e.g., revolutions per minute (RPMs)) of the primary rotor 108. In this synchronous arrangement, each of the variable-pitch primary blades 110 is arranged at the same blade pitch 172 relative to the other variable-pitch primary blades 110, irrespective of the variable-pitch blade's 110 position in the rotation. Thus, unlike a cyclic control where the mechanical pitch angle (aka, feathering angle) of each rotor blade is independently adjusted depending on its position in the cycle, the variable-pitch primary blades 110 adjust synchronously. Accordingly, the primary rotor 108 may provide collective control only and need not support cyclic control, thereby eliminating the need for any traditional cyclic control hardware or components.

As illustrated, a tiltable secondary rotor assembly 114 is positioned proximate each of the wingtips 142c, 144c, 146c, 148c of each of the forward wing set 104 and the aft wing set 106. Unlike the primary rotor 108. Each of the tiltable secondary rotor assemblies 114 has a pivotable axis of rotation 166 that can tilt forward (toward the nose end 156) or aft (toward the tail end 158). A tiltable secondary rotor assembly 114 may be positioned on each of the port-side forward wing 142, the starboard-side forward wing 144, the port-side aft wing 146, and the starboard-side aft wing 148 and configured to pivot between a vertical configuration (e.g., when the VTOL aircraft 100 is in a hover configuration for hover phase) and a cruise configuration (e.g., when the VTOL aircraft 100 is in a cruise configuration for cruise phase). In certain aspects, the plurality of tiltable secondary rotor assemblies 114 may comprise four tiltable secondary rotor assemblies 114 arranged in a quadrilateral layout about the primary rotor 108 (as best illustrated in FIGS. 1f and 1g), wherein each of the four tiltable secondary rotor assemblies 114 is positioned at or near a wingtip 142c, 144c, 146c, 148c on the forward wing set 104 and the aft wing set 106. The quadrilateral layout may be trapezoidal (as illustrated), rectangular, square, etc. While each wing 142, 144, 146, 148 is illustrated as having a single tiltable secondary rotor assembly 114 associated therewith, additional tiltable secondary rotor assemblies 114 may be provided at one or more of the wings 142, 144, 146, 148. While four tiltable secondary rotor assemblies 114 are illustrated, additional or fewer tiltable secondary rotor assemblies 114 may be utilized.

Each of the port-side forward wing 142, the starboard-side forward wing 144, the port-side aft wing 146, and the starboard-side aft wing 148 may be an adaptable wing that is configured to tilt, pivot, and/or fold along its span. In the illustrated embodiment, each of the wings 142, 144, 146, 148 includes a wing-tilt mechanism 138 that is configured to pivot (and/or fold) the tiltable secondary rotor assembly 114 via the outboard wing portions 142b, 144b, 146b, 148b relative to the airframe 102 and an inboard wing portion 142a, 144a, 146a, 148a of the wing 142, 144, 146, 148. As illustrated in FIGS. 1f and 1g, for example, the wing-tilt mechanism 138 may be positioned between the inboard wing portion 142a, 144a, 146a, 148a and outboard wing portion 142b, 144b, 146b, 148b at a point that is inboard of the tiltable secondary rotor assembly 114 (i.e., between the airframe 102 and the tiltable secondary rotor assembly 114). Each wing-tilt mechanism 138 may include a mechanical pivot mechanism (e.g., a pivoting rod or hinge) and a tilt actuator (e.g., an electro-mechanical actuator, such as tilt actuator 620 shown in FIG. 6c) configured to pivot the tiltable secondary rotor assembly 114 via the mechanical pivot mechanism in response to, for example, a tilt control command from a processor or a flight control system.

Referring again to FIG. 1a, each secondary rotor 116 may include a plurality of variable-pitch secondary blades 118 radially coupled to a secondary rotor hub 120, which, in turn, is rotated about a pivotable axis of rotation 166 via an electric motor to generate a desired thrust. Like the primary rotor 108, the variable-pitch secondary blades 118 of the secondary rotor 116 are collective-only. In other words, the variable-pitch secondary blades 118 of the secondary rotor 116 may also be synchronous variable-pitch blades. While the secondary rotor 116 is illustrated as unshrouded, in certain aspects, the secondary rotor 116 may be a shrouded and/or provided as a ducted lift fan. For example, the secondary rotor 116 may be shrouded and integrated into a portion (e.g., outboard wing portions 142b, 144b, 146b, 148b) of the wing (e.g., the forward wing set 104 or the aft wing set 106) and configured to pivot relative to the airframe 102 and inboard wing portion 142a, 144a, 146a, 148a. In operation, the primary rotor 108 provides a majority of the lift requirements, while the plurality of tiltable secondary rotor assemblies 114 provide the pitch and roll control requirement, thereby obviating the need for a primary rotor 108 with cyclic control. However, it should be appreciated that the tiltable secondary rotor assemblies 114 may also provide lift (e.g., when in the vertical and intermediate configurations of the transition and cruise phases), thereby at least partially unloading the primary rotor 108.

As illustrated, the airframe 102 can include a cockpit/cabin 134 for one or more human operators and/or passengers. For example, the illustrated VTOL aircraft 100 can be configured to carry passengers and/or cargo. The VTOL aircraft 100 may be used as, for example, an air taxi, emergency vehicle (e.g., ambulance), pleasure craft, cargo transport, etc. The cockpit/cabin 134 may include a forward facing transparent aircraft canopy 136 fabricated from, for example, a glass material, and/or an acrylic material. In certain aspects, the aircraft canopy 136 may be configured to provide a substantially unobstructed view to the passengers/pilot (e.g., a 360-degree view to provide forward, rear, side, and upward views). The VTOL aircraft 100 is generally illustrated as having a cockpit for manned operation, but may also be configured as unmanned (i.e., requiring no onboard pilot) or as both unmanned and fully autonomous (i.e., requiring neither an onboard pilot nor a remote control pilot). For example, the VTOL aircraft 100 may be remotely controlled over a wireless communication link by a human operator, computer operator (e.g., remote autopilot), or base station.

To facilitate takeoff and landing, the VTOL aircraft 100 may be provided with one or more sets of landing gear 122 (e.g., nose-end landing gear at the nose end 156 and main landing gear), which may be positioned at or adjacent the undercarriage of the airframe 102 of the VTOL aircraft 100. The landing gear 122 may include, inter alia, a set of wheels (as illustrated) and/or landing skids. In operation, the landing gear 122 supports the VTOL aircraft 100 when it is not flying; thereby allowing it to take off, land, and taxi without causing damage to the airframe 102. The landing gear 122 may attach directly to the airframe 102 (e.g., via an internal bulkhead, rib, spar, or other structural support) or via an intermediate structure, such as an intermediate airframe structure 124 (as illustrated). The intermediate airframe structure 124 may be sized and shaped such that it is wider than the airframe 102, thereby providing a wider footprint for the aft/main landing gear 122. In certain aspects, the intermediate airframe structure 124 and the airframe 102 may be fabricated as a single structure (e.g., the airframe 102 is shaped to define the intermediate airframe structure 124). The profile of the intermediate airframe structure 124 may be shaped as an airfoil, which can reduce drag during cruise phase and portions of transition phase. The intermediate airframe structure 124 may further serve as an attachment point for a payload, such as a deployable payload (e.g., a projectile).

The VTOL aircraft 100 may be configured to enable an intelligence, surveillance, and reconnaissance ("ISR") payload 126 to be coupled to the airframe 102. In operation, the ISR payload 126 is configured to collect data and/or monitor an area using a camera or other sensor device. The ISR payload 126 may be coupled to the airframe 102 at, for example, the forward end of the airframe 102 (e.g., at or near the nose end 156).

The VTOL aircraft 100 may have a wingspan and a length each of about 30-50 feet, or about 40 feet. The diameter of the primary rotor 108 may be, for example about 30-50 feet, or about 40 feet. The VTOL aircraft 100 may be sized and shaped to be transported by a transport aircraft. To reduce the footprint of the VTOL aircraft 100 during transport and/or storage, components of the VTOL aircraft 100 may be configured to fold, such as the forward wing set 104, the aft wing set 106, primary rotor 108 and/or secondary rotor 116. For example, the forward wing set 104 and the aft wing set 106 may fold (e.g., at or via the wing-tilt mechanism 138) such that the VTOL aircraft 100 is reduced to an overall width of about 17 feet. While example dimensions are provided, one of skill in the art would appreciate, however, that the size of the VTOL aircraft 100 may be scaled up or down to meet the needs of a particular operation.

Figure 2A:
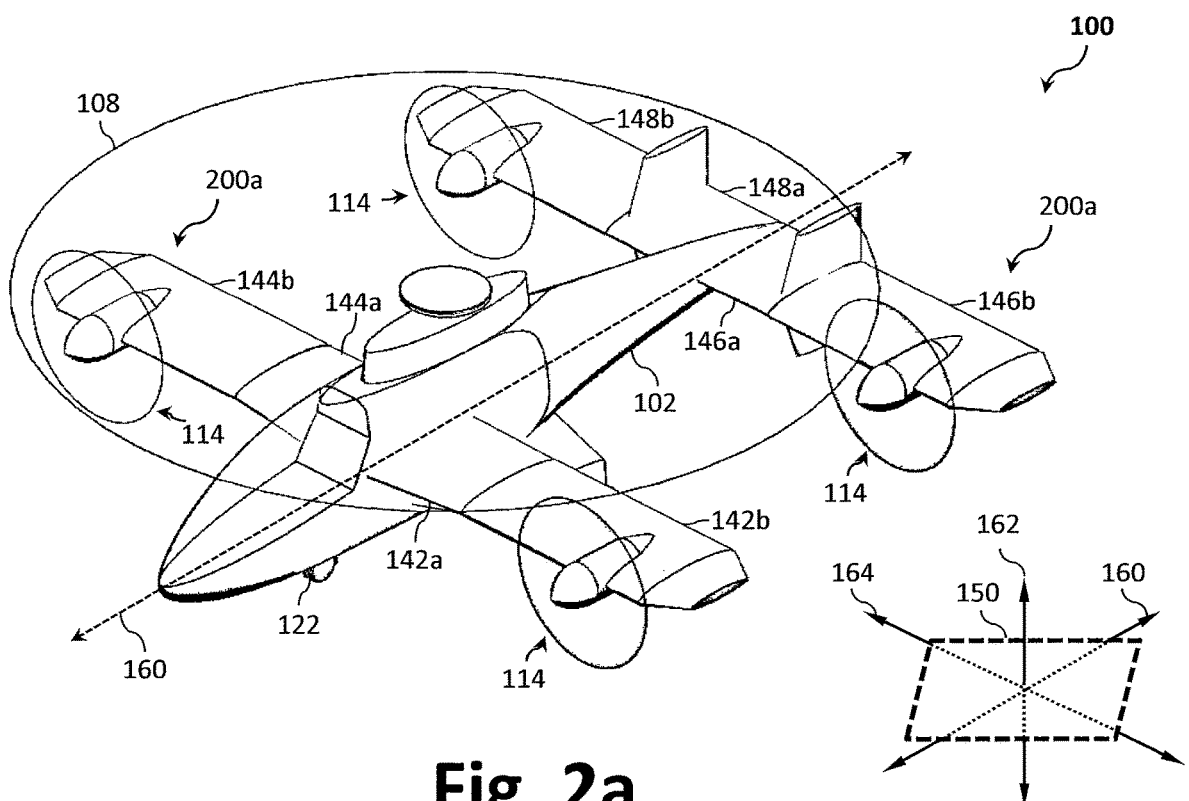
FIG. 2a illustrates an isometric view of the example VTOL aircraft in a cruise configuration.
Figure 2B:
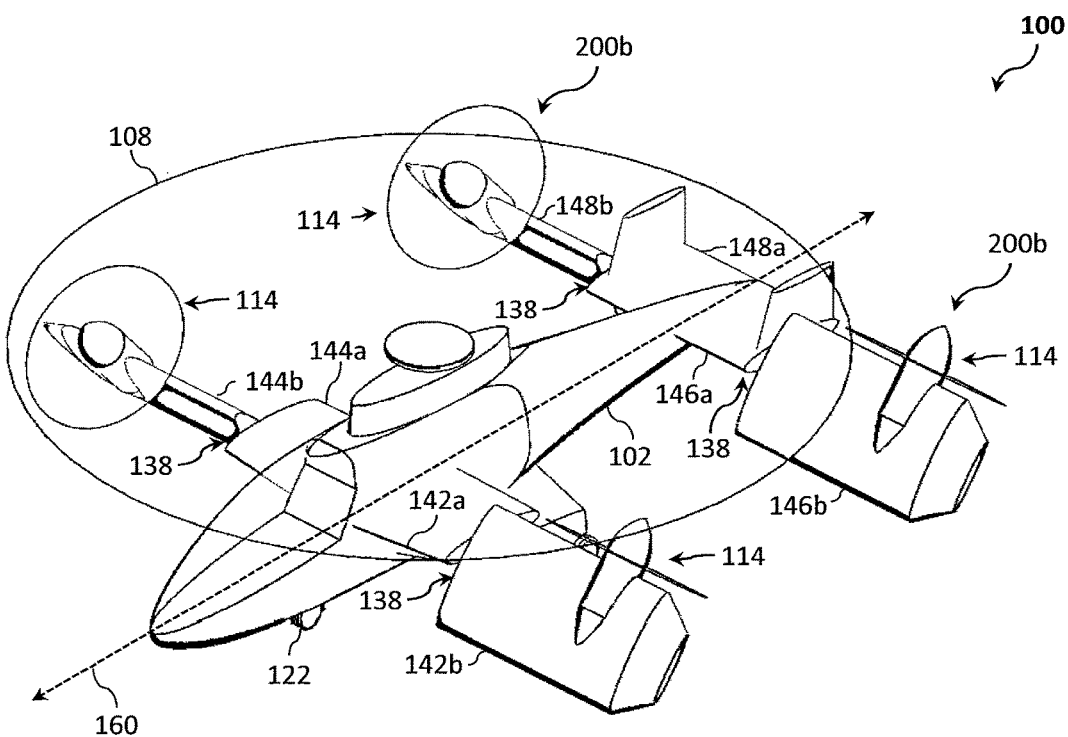
FIG. 2b illustrates an isometric view of the example VTOL aircraft in a hover configuration.

FIG. 2a illustrates an isometric view of the example VTOL aircraft 100 in a cruise configuration for cruise phase, while FIG. 2b illustrates an isometric view of the example VTOL aircraft 100 in a hover configuration for hover phase. As illustrated, each of the tiltable secondary rotor assemblies 114 is configured to pivot between a vertical configuration 200b and a horizontal configuration 200a and any intermediate configurations therebetween. The tiltable secondary rotor assemblies 114 may be configured in the horizontal configuration 200a when the VTOL aircraft is in the cruise configuration (e.g., during cruise phase) and in the vertical configuration 200b when the VTOL aircraft is in the hover configuration (e.g., during hover phase). In the hover configuration, each of the tiltable secondary rotor assemblies 114 is configured in a vertical configuration 200b to at least partially unload the primary rotor 108. During transition between the vertical configuration 200b and the horizontal configuration 200a, the tiltable secondary rotor assemblies 114 may be configured to transition via an intermediate configuration where the tiltable secondary rotor assemblies 114 pivot dynamically between the vertical configuration 200b and the horizontal configuration 200a as a function of the airspeed of the VTOL aircraft 100.

As will be described below (e.g., in connection with FIGS. 3a through 4c), certain of the tiltable secondary rotor assemblies 114 tilt beyond/past the vertical axis (e.g., the normal axis 162) when in the vertical configuration 200b. In contrast to conventional helicopter control methodology, which uses links to flap and bend the primary blade, the tiltable secondary rotor assemblies 114 can be actively aimed via a tilt-control system (e.g., via a processor 612 and secondary pitch actuators 622). Further, the RPM and collective (e.g., pitch angle) can be controlled dynamically (e.g., via a processor 612) to allow for control of the vehicle 100 in the hover phase. For example, in the vertical configuration 200b, two of the four tiltable secondary rotor assemblies 114 point somewhat backward, while the other two of the four tiltable secondary rotor assemblies 114 point somewhat forward; thereby counteracting the torque from the primary rotor 108.

As illustrated in FIG. 2a, the horizontal configuration 200a for each of the tiltable secondary rotor assemblies 114 is the same when the VTOL aircraft 100 is in the cruise configuration, regardless of the physical position of the tiltable secondary rotor assemblies 114 relative to the primary rotor 108. Specifically, each of the tiltable secondary rotor assemblies 114 is arranged in a tractor configuration (i.e., the secondary rotors 116 are positioned forward so that the aircraft 100 is pulled through the air, as opposed to pushed) to direct thrust toward the tail end 158 of the VTOL aircraft 100 during cruise, where the pivotable axis of rotation 166 of the tiltable secondary rotor assemblies 114 is generally parallel to the transverse plane 150 of the VTOL aircraft 100 (i.e., 0 degrees off the transverse plane 150). With reference to FIG. 2a, the transverse plane 150 is the plane defined by the longitudinal axis 160 (e.g., roll/horizontal axis) and the lateral (pitch) axis 164 of the VTOL aircraft 100.

In the hover configuration, however, the vertical configuration 200b of each of the tiltable secondary rotor assemblies 114 may be adjusted as a function of its location relative to the primary rotor 108. Therefore, in addition to airspeed, each of the plurality of tiltable secondary rotor assemblies 114 may pivot as a function of its position relative to the primary rotor 108. Specifically, rather than simply directing the thrust straight downward (i.e., 90 degrees off the transverse plane 150, which would be parallel with the normal (yaw) axis 162), each of the tiltable secondary rotor assemblies 114 is oriented to counter the yaw torque of the primary rotor 108 during the hover phase. In the illustrated embodiment, the tiltable secondary rotor assemblies 114 arranged on the port-side 154 of the airframe 102 may be oriented to direct thrust downward and forward (toward the nose end 156) while tiltable secondary rotor assemblies 114 arranged on the starboard-side 152 of the airframe 102 are oriented to direct thrust downward and aft (toward the tail end 158). By pivoting thrust to be non-parallel to the normal axis 162 of the VTOL aircraft 100, the tiltable secondary rotor assemblies 114 can provide counter-yaw-torque and pitch balance to the VTOL aircraft during the hover phase. This will be further described in connection with FIGS. 3a through 3c and 4a through 4c.

FIGS. 3a through 3c illustrate, respectively, side elevation views of the example VTOL aircraft 100 in a hover configuration 300a, an intermediate configuration 300b, and a cruise configuration 300c, while FIGS. 4a through 4c illustrate the hover configuration 300a, the intermediate configuration 300b, and the cruise configuration 300c overlaid with the various forces generated by the primary rotor 108 and the tiltable secondary rotor assemblies 114, along with the forces imparted on the airframe 102.

In operation, the plurality of tiltable secondary rotor assemblies 114 may be configured to transition between a vertical configuration 200b of the hover configuration 300a and a horizontal configuration 200a of the cruise configuration 300c via a transition configuration (e.g., illustrated as intermediate configuration 300b) as a function of airspeed and/or a phase of flight of the VTOL aircraft 100 (e.g., cruise phase, hover phase, and intermediate phase). As an example, in one mode of operation, the VTOL aircraft 100 may be configured to operate in the hover configuration 300a when the true airspeed is approximately 0 knots true airspeed (KTAS), whereas the VTOL aircraft 100 may be configured to operate in the cruise configuration 300c when the true airspeed is approximately 100 KTAS or greater (e.g., the VTOL aircraft 100 is wing-borne). For speeds that are greater than approximately 0 KTAS, but less than approximately 100 KTAS, the VTOL aircraft 100 is configured to operate in an intermediate configuration 300b wherein the tilt-angle (and/or thrust) of each of tiltable secondary rotor assemblies 114 is adjusted as a function of the airspeed of the VTOL aircraft 100 (e.g., in real-time, or near real-time). In the exemplary embodiment, the airspeed of the VTOL aircraft 100 is determined using one or more sensors (e.g., a pitot tube) and input into the controller responsible for driving and/or pivoting the tiltable secondary rotor assemblies 114.

With reference to the hover configuration 300a of FIG. 3a, the primary rotor 108 is driven to generate lift and the tiltable secondary rotor assemblies 114 are oriented and driven to generate lift to at least partially unload the primary rotor 108. As best illustrated in the FIG. 4a, a downdraft force is imparted on the airframe 102 and the primary rotor 108 generates a high thrust (providing lift to the VTOL aircraft 100) and a high yaw torque about the normal axis (resulting from rotation of the primary rotor 108). To address the high yaw torque from the primary rotor 108, each of the tiltable secondary rotor assemblies 114 is pivoted to a vertical configuration 200b to generate thrust at a thrust vector that counters the high yaw torque. Specifically, in the hover configuration 300a, the tiltable secondary rotor assemblies 114 arranged on the port-side 154 of the airframe 102 are oriented to direct thrust downward and forward while tiltable secondary rotor assemblies 114 arranged on the starboard-side 152 of the airframe 102 are oriented to direct thrust downward and aft. In certain aspects, the tiltable secondary rotor assemblies 114 arranged on the port-side 154 of the airframe 102 may be oriented about 140 to 150 degrees (or about 146 degrees, as illustrated) relative to the transverse plane 150, while tiltable secondary rotor assemblies 114 arranged on the starboard-side 152 of the airframe 102 are oriented forward about 30 to 40 degrees (or about 34 degrees, as illustrated) relative to the transverse plane 150.

The thrust from the tiltable secondary rotor assemblies 114 may be independently controlled (e.g., thrust can be increased or decreased) to provide pitch balance about the lateral (pitch) axis 164 and roll balance about the longitudinal (roll) axis 160. For example, to pitch the nose end 156 upward about the lateral axis 164, the secondary rotor assemblies 114 positioned on the forward wing set 104 may be controlled to increase thrust and/or the secondary rotor assemblies 114 positioned on the aft wing set 106 may be controlled to decrease thrust. Similarly, to move or tilt the wingtips 142c, 146c on the port-side 154 of the VTOL aircraft 100 downward about the longitudinal axis 160, the secondary rotor assemblies 114 positioned on the starboard-side 152 of the airframe 102 may be controlled to increase thrust and/or the secondary rotor assemblies 114 positioned on the port-side 154 may be controlled to decrease thrust. As will be described below, thrust from each of the secondary rotor assemblies 114 may be independently controlled by adjusting the speed of its electric motor and/or by adjusting a pitch angle of the variable-pitch secondary blades 118 of the secondary rotor 116 of a desired secondary rotor assembly 114 (e.g., via a secondary pitch actuator).

With reference to the intermediate configuration 300b of FIG. 3b, the primary rotor 108 is driven (though at a lower power) and the tiltable secondary rotor assemblies 114 are oriented to generated greater forward thrust. As a result, lift and drag forces are imparted on the airframe 102, while the primary rotor 108 may be used to generate thrust, yaw, and high roll forces. In the forward flight configuration, however, the primary rotor 108 does not generate high thrust, yaw, or roll forces; rather, it reduces in collective and generates very little force (e.g., as close to 0 as is possible) in forward flight. During the intermediate phase from hover phase to cruise phase, the tiltable secondary rotor assemblies 114 arranged on the port-side 154 of the airframe 102 transition from the vertical configuration 200b (e.g., a tilt-angle of 140 to 150 degrees relative to the transverse plane 150) to the horizontal configuration 200a (e.g., a tilt-angle of 0 degrees relative to the transverse plane 150) as a function of airspeed, while tiltable secondary rotor assemblies 114 arranged on the starboard-side 152 of the airframe 102 transition from the vertical configuration 200b (e.g., a tilt-angle of 30 to 40 degrees relative to the transverse plane 150) to the horizontal configuration 200a (e.g., a tilt-angle of 0 degrees relative to the transverse plane 150) as a function of airspeed. Conversely, during the intermediate phase from cruise phase to hover phase, the tiltable secondary rotor assemblies 114 arranged on the port-side 154 of the airframe 102 transition from the horizontal configuration 200a to the vertical configuration 200b as a function of airspeed, while tiltable secondary rotor assemblies 114 arranged on the starboard-side 152 of the airframe 102 transition from the horizontal configuration 200a to the vertical configuration 200b as a function of airspeed.

To compensate for the yaw and high roll forces generated by the primary rotor 108 and the drag imparted on the airframe 102, each of the tiltable secondary rotor assemblies 114 is pivoted about its wing-pivot axis 170 to generate a thrust vector (which coincides with its pivotable axis of rotation 166) that provides counter-yaw, counter-roll, and counter-drag forces. For example, FIGS. 3b and 4b illustrate an example intermediate configuration 300b for a VTOL aircraft 100 operating at about 50 to 70 KTAS, where the tiltable secondary rotor assemblies 114 arranged on the port-side 154 are oriented at a tilt-angle of about 85 degrees relative to the transverse plane 150 and tiltable secondary rotor assemblies 114 arranged on the starboard-side 152 of the airframe 102 are oriented at a tilt-angle of about 23 degrees relative to the transverse plane 150.

With reference to FIG. 5a, the VTOL aircraft 100 may be configured to facilitate multiple phases of flight, including the hover phase 500a, the cruise phase 500c, and the transition phase 500b between the hover phase 500a and cruise phase 500c. During the hover phase 500a, the aircraft 100 is configured in the hover configuration 300a, where each of the tiltable secondary rotor assemblies 114 is in the vertical configuration 200b, while the aircraft 100 is configured in the cruise configuration 300c during the cruise phase 500c, where each of the tiltable secondary rotor assemblies 114 is in the horizontal configuration 200a. During the transition phase 500b, the aircraft 100 is configured in the intermediate configuration 300b where each of the tiltable secondary rotor assemblies 114 is positioned at an intermediate tilt-angle between the horizontal configuration 200a and the vertical configuration 200b. As those of skill in the art understand, the VTOL aircraft 100 travels vertically at a speed of about 0 KTAS during hover phase 500a to facilitate hover and VTOL operation (e.g., takeoff and landing). During cruise phase 500c, the VTOL aircraft 100 is wing-borne (e.g., at about 100+ KTAS) to facilitate forward flight operation, while the transition phase 500b refers to the transition between the hover phase 500a and cruise phase 500c where the speed is greater than 0 KTAS, but less than a wing-borne speed (e.g., less than 100 KTAS). During the transition phase 500b, for example, each of the tiltable secondary rotor assemblies 114 may be dynamically and independently pivoted about its wing-pivot axis 170 as a function of the airspeed to generate a thrust vector that provides counter-yaw, counter-roll, and counter-drag forces.

The graph 502 of FIG. 5b illustrates the tilt-angle of the port-side tiltable secondary rotor assemblies 114 and starboard-side tiltable secondary rotor assemblies 114 during the transition phase 500b as the airspeed increases from 0 KTAS (hover phase 500a) to 100+ KTAS (cruise phase 500c—illustrated as a cruise speed of 100 to 250 KTAS). The tilt-angle represents the angle in degrees between the transverse plane 150 and the pivotable axis of rotation 166 of the given tiltable secondary rotor assemblies 114 as described and illustrated in connection with FIGS. 3a through 3c. As illustrated in the graph 502, the tiltable secondary rotor assemblies 114 on the port-side 154 pivot together (e.g., simultaneously), while the tiltable secondary rotor assemblies 114 on the starboard-side 152 pivot together. As can be appreciated, throughout the transition from the hover phase 500a to the cruise phase 500c, the starboard-side tiltable secondary rotor assemblies 114 remain angled below 90 degrees, specifically, from about 34 degrees (0 KTAS) to 0 degrees (90 KTAS). Conversely, the port-side tiltable secondary rotor assemblies 114 transition from about 146 degrees (0 KTAS), past the vertical, 90-degree point (at about 57 KTAS), to 0 degrees (at about 100 KTAS). As is apparent from the graph 502, the starboard-side tiltable secondary rotor assemblies 114 achieve the 0-degree cruise configuration at a lower speed (e.g., about 10 KTAS lower)—i.e., before the port-side tiltable secondary rotor assemblies 114.

In the cruise configuration 300c, the VTOL aircraft 100 achieves wing-borne flight such that the primary rotor 108 is fully unloaded and, therefore, does not need to be driven to generate lift/thrust, while the tiltable secondary rotor assemblies 114 are oriented at 0 degrees to generate forward thrust for controlled wing-borne flight; effectively becoming forward propellers. For example, the collective of the primary rotor 108 can be adjusted to zero so that it then consumes only a nominal amount of power. The primary rotor 108 provides zero thrust and zero roll, but lift and drag forces are imparted on the airframe 102. Further, while the primary rotor 108 is disengaged, the primary rotor 108 can still result in a nominal amount of yaw forces and drag. As best illustrated in FIG. 4c, each of the tiltable secondary rotor assemblies 114 is driven to generate a thrust vector that provides counter-yaw, counter-roll, and counter-drag forces. Specifically, each of the tiltable secondary rotor assemblies 114 is pivoted to generate a thrust toward the aft end of the VTOL aircraft 100 such that a thrust vector defined by the thrust is generally parallel to the longitudinal axis 160 (i.e., roll axis) of the VTOL aircraft 100. In other words, each of the tiltable secondary rotor assemblies 114 is oriented 0 degrees relative to the transverse plane 150.

The thrust from the tiltable secondary rotor assemblies 114 may be independently controlled, together with the movable rudder 130 and trailing edge flaps 132, to provide yaw and roll balance. As the primary rotor 108 does not need to provide lift during the cruise phase 500c, the plurality of variable-pitch primary blades 110 of the primary rotor 108 can be adjusted to 0-degrees (relative to the transverse plane 150) to reduce drag.

Figure 6A:
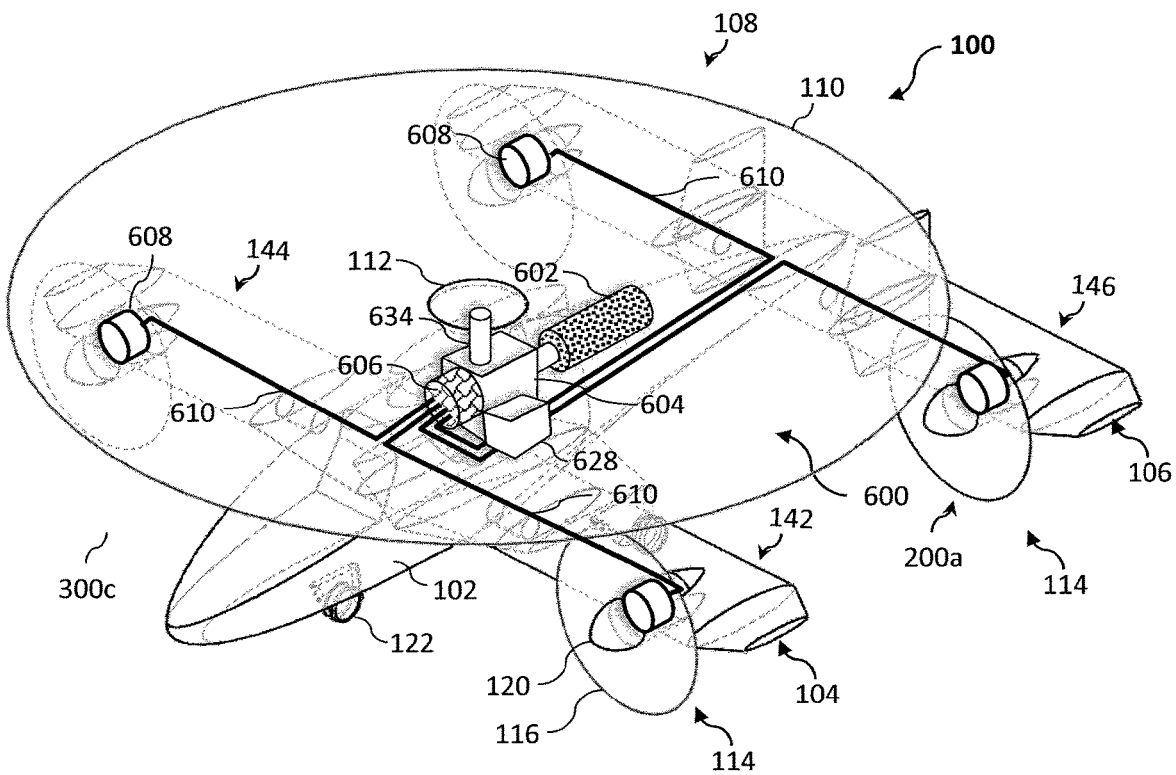
FIG. 6a illustrates an isometric view of the example VTOL aircraft drawn in ghost lines to better illustrate its internal hybrid propulsion system.
Figure 6B:
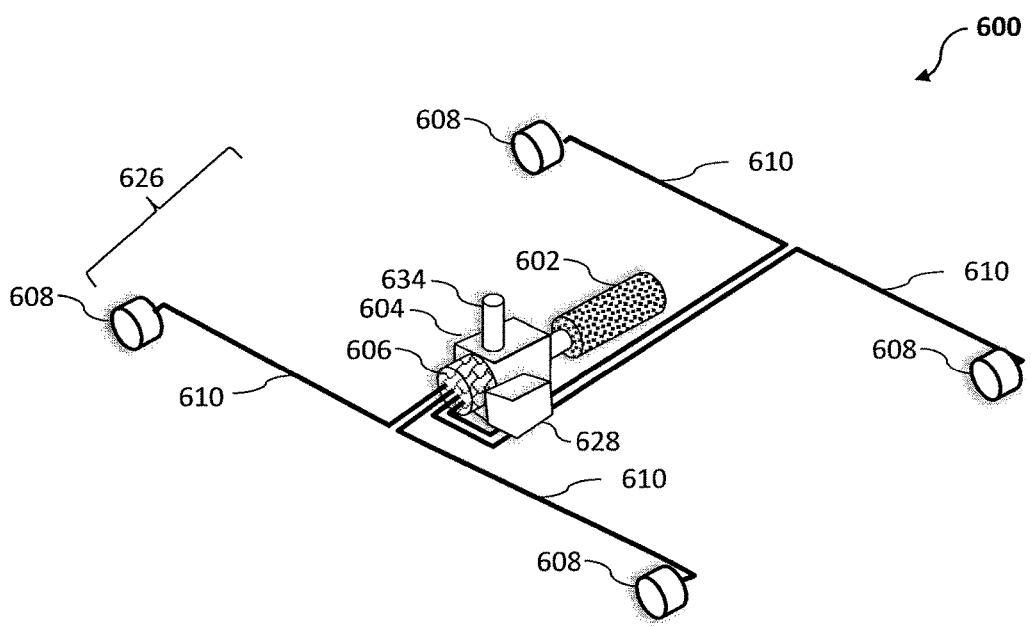
FIG. 6b illustrates an isometric view of the hybrid propulsion system.
Figure 6C:
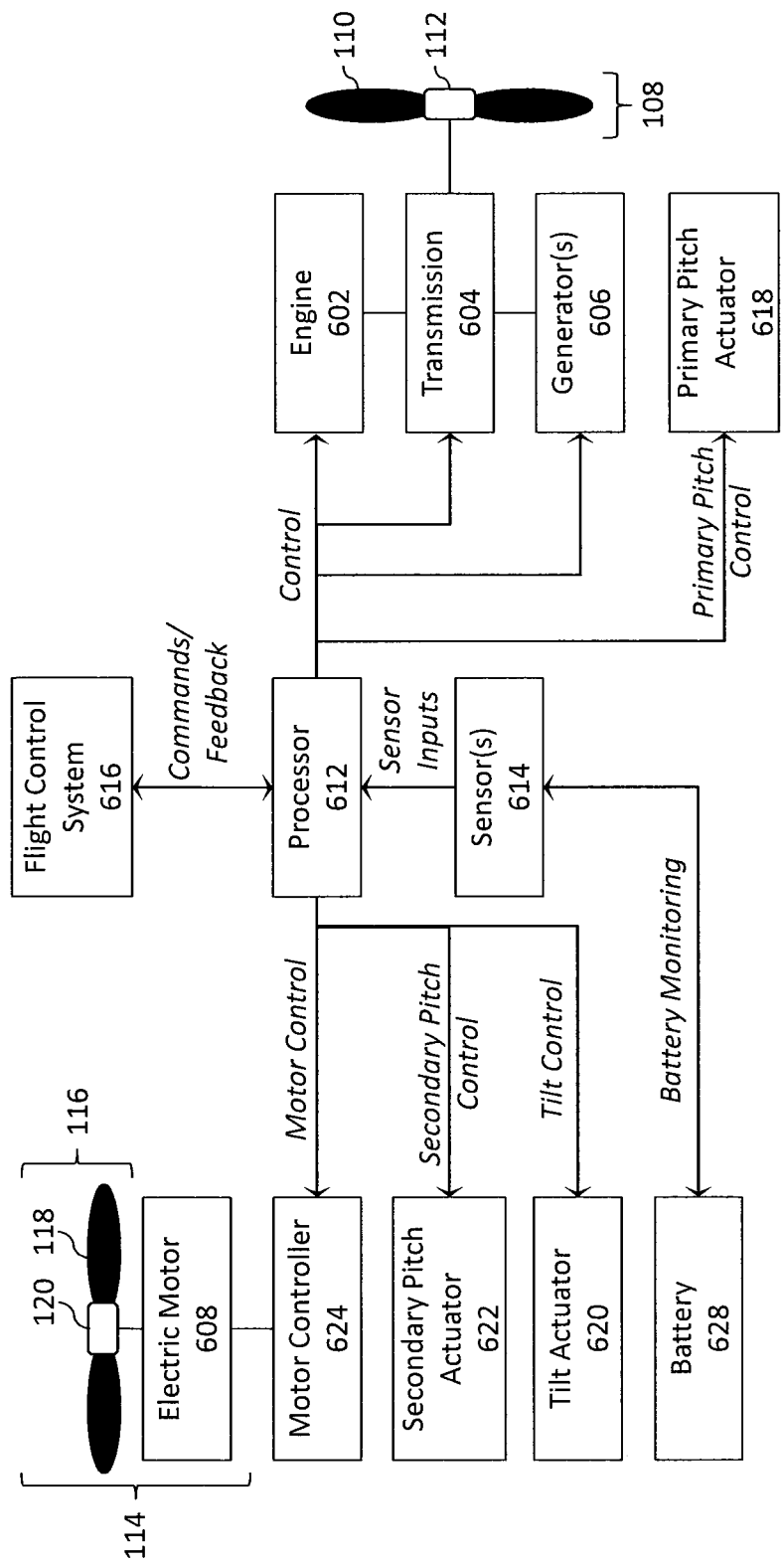
FIG. 6c illustrates a block diagram of the hybrid propulsion system.
Figure 6D:
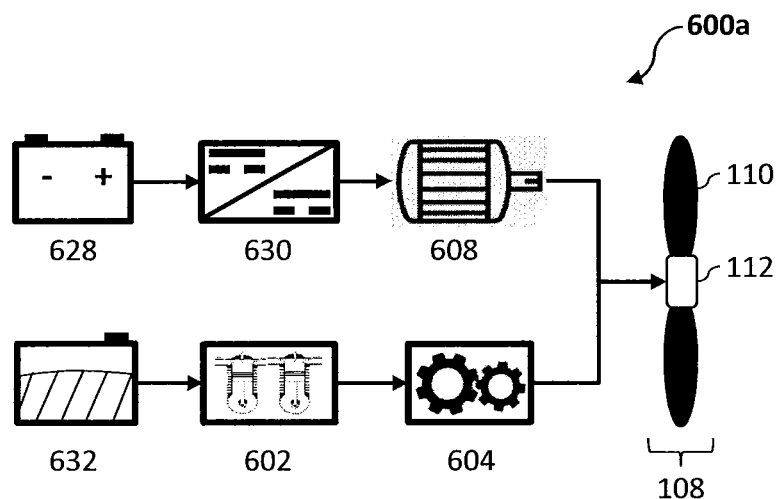
FIGS. 6d and 6e illustrate block diagrams of example electrical and mechanical arrangements in a hybrid propulsion system.
Figure 6E:
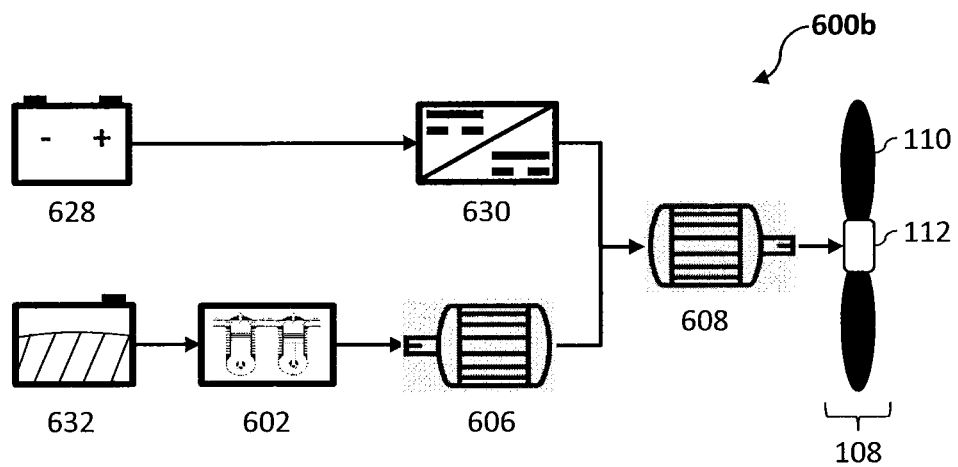

FIG. 6a illustrates an isometric view of the example VTOL aircraft 100 drawn in ghost lines to better illustrate its internal hybrid propulsion system 600, whereas FIG. 6b illustrates the hybrid propulsion system 600 separately from the VTOL aircraft 100. FIG. 6c illustrates a block diagram of the example hybrid propulsion system 600, while FIGS. 6d-6e illustrate block diagrams of parallel electrical and mechanical arrangements in a hybrid propulsion system 600.

As illustrated, the hybrid propulsion system 600 generally comprises an engine 602, a mechanical transmission 604, one or more electric generators 606, and a plurality of electric motors 608. Each tiltable secondary rotor assembly 114 generally comprises an electric motor 608 coupled to, and configured to drive/rotate, a secondary rotor 116. The engine 602 may be, for example, a turbine engine. The engine 602 is mechanically coupled to the mechanical transmission 604, either directly or via a drive shaft. Torque from the engine 602 is transferred to the primary rotor hub 112 of the primary rotor 108 via the mechanical transmission 604 and one or more drive shafts. In operation, the mechanical transmission 604 may be used to adjust the speed at which the primary rotor 108 rotates (e.g., in response to commands form a flight control system or a processor). As illustrated, the mechanical transmission 604 provides two mechanical outputs: the first mechanical output provides rotational power to the primary rotor 110 via the primary rotor shaft 634 and the second mechanical output provides rotational power the generator(s) 604 to generate power, which is then distributed to the tiltable secondary rotor assemblies 114.

In other words, the hybrid propulsion system 600 employs a drivetrain 626 to transfer drive power from a power source to the primary rotor 108 and the secondary rotors 116. The power source may be the engine 602, the one or more electric generators 606, or a battery 628, which may be charged using power from the one or more electric generators 606, solar panels, etc. The battery 628, which is preferably rechargeable, may be, for example, a lithium-based battery. In operation, the drivetrain 626 conveys mechanical power (i.e., mechanical forces), electrical power, or a combination thereof to drive the rotors (e.g., primary rotor 108, secondary rotors 116, etc.) via the mechanical transmission 604, one or more mechanical linkages (e.g., linkages, gears, drive shafts, etc.), and electrical conductors 610. For example, the drivetrain 626 may convey drive power in the form of mechanical power from the engine 602 to the primary rotor 108 using the mechanical transmission 604 and one or more mechanical linkages. Similarly, to drive the secondary rotors 116, the drivetrain 626 may convey drive power in the form of electrical power from the one or more electric generators 606 to the electric motors 608 using the electrical conductors 610, which may include or more busses, connectors, etc.

In the illustrated embodiment, the VTOL aircraft includes a single electric generator 606 that is mechanically coupled to, and driven by, the mechanical transmission 604. It should be realized that the VTOL aircraft may include more than one electric generator 606 in other embodiments. In operation, the electric generator 606 supplies electric power to the electric motor 608 of each of the plurality of tiltable secondary rotor assemblies 114. In certain aspects, the electric generator 606 may instead be mechanically coupled directly to the engine 602. In operation, the engine 602 drives the electric generator 606 to generate electric power, whether directly or via the mechanical transmission 604. Each of the electric motors 608 is electrically coupled to the electric generator 606 via one or more electrical conductors 610 (e.g., cables of a wiring harness). The electric generator 606 is configured to generate the electrical power needed to operate the various components of the VTOL aircraft 100 (i.e., in addition to the electric motor(s) 608).

The electric motor 608 may be pivotally coupled to the port-side forward wing 142, the starboard-side forward wing 144, the port-side aft wing 146, and the starboard-side aft wing 148. In the illustrated example, each electric motor 608 is controlled via a motor controller 624, such as an electronic speed controller (ESC) unit.

Thrust from the secondary rotor 116 of each tiltable secondary rotor assembly 114 is independently adjustable (increased or decreased) by, for example, adjusting the velocity of the electric motor 608 and/or adjusting the blade pitch 172 of the variable-pitch secondary blades 118 via a secondary pitch actuator 622. Thus, the secondary rotor 116 of each of the plurality of tiltable secondary rotor assemblies 114 may be a variable-pitch rotor, where the variable-pitch rotor of each of the plurality of tiltable secondary rotor assemblies 114 is independently controllable to achieve a desired thrust (e.g., to counter thrust, yaw, and/or roll forces). For example, the blade pitch 172 of each secondary rotor 116 may be independently controlled relative to the other secondary rotors 116 to generate a desired thrust at each secondary rotor 116 (whether the same or different thrusts).

The thrust-adjustment technique may be selected depending on the size of the VTOL aircraft 100. In smaller vehicles, for example, thrust from the secondary rotors 116 may be controlled by adjusting the rotational velocity of the secondary rotors 116, which removes the need for variable-pitch components. In which case, a motor controller 624 may be used to adjust the speed of the electric motor 608. In larger aircraft, however, thrust from the secondary rotors 116 may be controlled using a plurality of variable-pitch secondary blades 118 radially coupled to a secondary rotor hub 120 under collective control via the secondary pitch actuator 622.

FIG. 6c illustrates a block diagram of an example hybrid propulsion system 600 where the primary rotor 108 is driven by a mechanical transmission 604 and the secondary rotor(s) 116 are driven by electric motors 608. For simplicity of illustration, only a single tiltable secondary rotor assembly 114 is illustrated and the various electrical conductors 610 and power-converting electronic circuitry are omitted, such as those electrical conductors 610 that electrically couple the one or more electric generators 606 to various power-consuming components (e.g., the electric motors 608, actuators 618, 620, 622, etc.). One of skill would recognize that a motor controller 624, a secondary pitch actuator 622, and/or a tilt actuator 620 may be provided for each tiltable secondary rotor assembly 114 of the hybrid propulsion system 600.

A processor 612 may be used to control and/or monitor the various components of the hybrid propulsion system 600 in response to commands from an operator, autopilot, or other high-level system (e.g., via the communication interface). The processor 612 may be operatively coupled with one or more sensors 614 and/or a flight control system 616. As illustrated, the processor 612 may receive one or more sensor inputs from the one or more sensors 614 (e.g., feedback signals), which may be used to generate and exchange commands (or feedback) with the flight control system 616. Example sensors 614 include, for example, pitot tubes (e.g., to provide airspeed readings), thermometers (providing temperature readings), angle sensors (e.g., to determine the tilt-angle), etc. For example, the processor 612 may be configured to transition the VTOL aircraft 100 between the hover configuration 300a (where the tiltable secondary rotor assemblies 114 are in the vertical configuration 200b) and cruise configuration 300c (where the tiltable secondary rotor assemblies 114 are in the horizontal configuration 200a) dynamically as a function of sensor inputs received by the processor 612 from the one or more sensors 614, such as airspeed measurement (e.g., in KTAS). While the processor 612 is illustrated as a separate component from the flight control system 616, the processor 612 and flight control system 616 may be provided as a single circuit or system.

The processor 612 may be configured to control operation of the primary rotor 108 based on, for example, instructions from the flight control system 616. In the illustrated embodiment, the processor 612 is communicatively and/or operatively coupled with, inter alia, the engine 602 and the primary pitch actuator 618. In operation, the processor 612 may be configured to provide engine control commands to throttle, or otherwise control operation of, the engine 602. The primary pitch actuator 618 may be mechanically coupled to the variable-pitch primary blades 110 of the primary rotor 108 and configured to adjust the angle of the blade pitch 172 of the variable-pitch primary blades 110 in response to primary pitch control commands from the processor 612, thereby adjusting thrust from the primary rotor 108. In other words, the processor 612 may provide collective control of the primary rotor 108 via the primary pitch actuator 618. The processor 612 may be communicatively coupled with each of the mechanical transmission 604 and the electric generator 606, and configured to control and/or adjust an operation thereof. For example, the processor 612 may disable the primary rotor 108 during cruise phase 500c via a control signal to the mechanical transmission 604.

The processor 612 may be further configured to control operation of each tiltable secondary rotor assembly 114 based on, for example, instructions from the flight control system 616. In the illustrated embodiment, the processor 612 may be operably coupled with a tilt actuator 620, a secondary pitch actuator 622, a motor controller 624, etc. The tilt actuator 620 is configured to adjust a tilt-angle of a tiltable secondary rotor assembly 114 based on a tilt control command from the processor 612. The secondary pitch actuator 622 may be mechanically coupled to the variable-pitch secondary blades 118 of the secondary rotor 116 and configured to adjust the blade pitch 172 of the variable-pitch secondary blades 118 in response to secondary pitch control commands from the processor 612, thereby individually adjusting thrust from the secondary rotors 116. In certain aspects, a motor controller 624 may be used to control the velocity of the electric motor 608, in which case the processor 612 may be configured to provide motor control signals to the motor controller 624 to adjust the speed of the electric motor 608. When a motor controller 624 is not used, power may be provided directly to the electric motor 608 and thrust may be adjusted via the secondary pitch actuator 622.

While the hybrid propulsion system 600 is described as a hybrid system where the primary rotor 108 is mechanically driven by the engine 602 (e.g., via the mechanical transmission 604) and the secondary rotors 116 are driven by the electric motors 608, other arrangements are contemplated. For example, an all-electric system may be utilized where the primary rotor 108 is driven by an electric motor that is powered by the one or more electric generators 606. In another example, an all-mechanical system is contemplated where the secondary rotors 116 are mechanically coupled with the mechanical transmission 604 and mechanically driven via a series of drive shafts and gearboxes (i.e., in lieu of the electric motor 608 and electrical conductors 610). For example, the hybrid propulsion system 600 may employ a hybrid electrical and mechanical arrangement where a single rotor can be selectively driven in an electrical or mechanical arrangement, Hybrid parallel arrangements, examples of which are illustrated in FIGS. 6d and 6e, can be advantageous in the event of equipment malfunction. For example, if an engine 602 were to malfunction, a battery 628 (e.g., a backup battery) may be used to power an electric motor 608 to drive a rotor until the VTOL aircraft 100 is able to safely land. While the rotor of FIGS. 6c and 6d is illustrated as a primary rotor 108, the first parallel hybrid propulsion system 600a and the second parallel hybrid propulsion system 600b may be used to drive the secondary rotor(s) 116 in substantially the same manner.

With reference to FIG. 6d, a first parallel hybrid propulsion system 600a comprises a battery 628, power-converting electronic circuitry 630 (e.g., a DC/DC converter), an electric motor 608, an engine 602 operatively coupled with a fuel tank 632, and a mechanical transmission 604 (or other gearing). During operation of the electrical arrangement, power stored to the battery 628 is converted (e.g., stepped up, stepped down, filtered, etc.) to a desired voltage via the power-converting electronic circuitry 630 and used to drive the electric motor 608. The battery 628 may be charged using the electric generator 606, line current (e.g., from a ground-based power grid before takeoff), solar panels, etc. The battery 628 may also be used to provide load smoothing. During operation of the mechanical arrangement, fuel stored to a fuel tank 632 is used to drive the engine 602. The engine 602 is mechanically coupled with the shaft of the primary rotor 108 via a mechanical transmission 604. The shaft to the primary rotor 108 is driven (rotated) via mechanical power from the electric motor 608 or the mechanical transmission 604.

As can be appreciated, the first parallel hybrid propulsion system 600a effectively uses two different components to mechanically drive the rotor, i.e., an electric motor 608 and a mechanical transmission 604. In certain aspects, it may be desirable to drive the rotor using a single devices, such as an electric motor 608, thereby obviating the need for a mechanical transmission 604. As illustrated in FIG. 6d, a second parallel hybrid propulsion system 600b employs an electric motor 608 to drive the primary rotor 108. The electric motor 608 is powered by electric power from either a battery 628 (via power-converting electronic circuitry 630) or from an electric generator 606 that is driven by an engine 602 coupled to a fuel tank 632.

Figure 7:
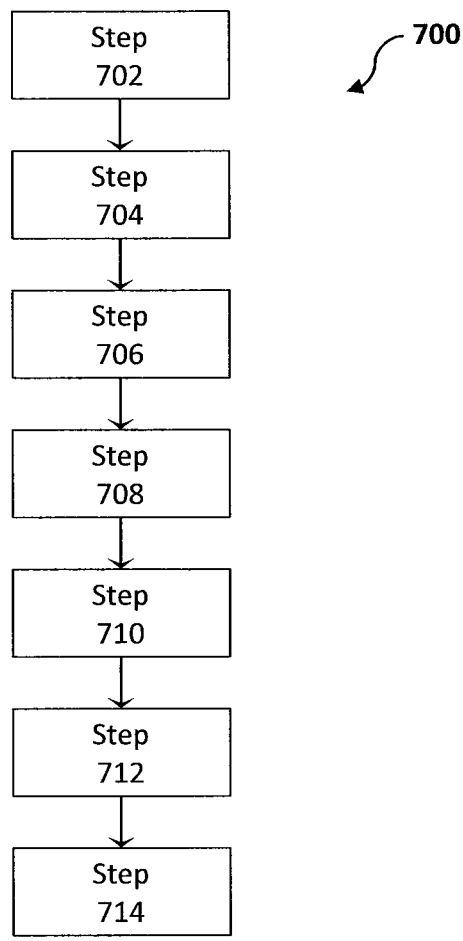
FIG. 7 illustrates an example method of transitioning the VTOL aircraft from a hover phase to a cruise phase.

FIG. 7 illustrates an example method 700 of controlling the VTOL aircraft 100 (e.g., via processor 612) to transition from a hover phase 500a where the VTOL aircraft 100 is configured in a hover configuration 300a (i.e., the tiltable secondary rotor assemblies 114 are oriented in the vertical configuration 200b) to a cruise phase 500c where the VTOL aircraft 100 is configured in a cruise configuration 300c (i.e., the tiltable secondary rotor assemblies 114 are oriented in the horizontal configuration 200a). In this example, the aircraft 100 includes an airframe 102, a mechanical transmission 604 operably coupled to an engine 602, a forward wing set 104, and an aft wing set 106.

At step 702, a primary rotor 108 is mechanically driven to provide lift to the airframe 102 during a hover phase 500a. The primary rotor 108, which is coupled to the airframe 102 via the mechanical transmission 604, comprises a plurality of synchronous variable-pitch primary blades 110 radially coupled to a primary rotor hub 112.

At step 704, electric power is generated via an electric generator 606 driven by the engine 602. In other words, the engine 602 can be configured to mechanically drive the electric generator 606 and the primary rotor 108 (whether directly or via the mechanical transmission 604).

At step 706, electric power from the electric generator 606 is supplied to an electric motor 608 of each of a plurality of tiltable secondary rotor assemblies 114. Each of the plurality of tiltable secondary rotor assemblies 114, which are disposed on the forward wing set 104 and/or the aft wing set 106 (e.g., at a wingtip 142c, 144c, 146c, 148c), includes a secondary rotor 116 operably coupled to the electric motor 608.

Each of the plurality of tiltable secondary rotor assemblies 114 is configured to pivot between a vertical configuration 200b and a horizontal configuration 200a. The tilt-angle of the plurality of tiltable secondary rotor assemblies 114 can be adjusted dynamically via a processor 612, as discussed above in connection with FIGS. 6a through 6e.

At step 708, each of the plurality of tiltable secondary rotor assemblies 114 is independently controlled to at least partially unload the primary rotor 108 during the hover phase 500a. For example, each of the plurality of tiltable secondary rotor assemblies 114 can be independently controlled to provide counter-yaw-torque and pitch balance to the aircraft 100 during the hover phase 500a (e.g., to provide pitch and roll control). The secondary rotor 116 of each of the plurality of tiltable secondary rotor assemblies 114 can be a variable-pitch rotor where a blade pitch 172 of each of the plurality of tiltable secondary rotor assemblies 114 can be independently controlled to achieve a desired thrust.

At step 710, each of the plurality of tiltable secondary rotor assemblies 114 is tilted from the vertical configuration 200b to the horizontal configuration 200a to transition the aircraft 100 from a hover configuration 300a to a cruise configuration 300c. In certain aspects, each of the plurality of tiltable secondary rotor assemblies 114 is pivoted as a function of its position relative to the primary rotor 108. For example, in the hover configuration 300a, (1) each of the plurality of tiltable secondary rotor assemblies 114 arranged on a port-side of the airframe 102 is oriented to direct thrust downward and forward and (2) each of the plurality of tiltable secondary rotor assemblies (114) arranged on a starboard-side of the airframe 102 is oriented to direct thrust downward and aft.

At step 712, the aircraft 100 operates in the cruise phase 500c where the VTOL aircraft 100 is configured in a cruise configuration 300c. During the cruise phase 500c, the aircraft 100 is wing-borne and powered by the thrust from the tiltable secondary rotor assemblies 114; the primary rotor 108 can be disengaged as it is not needed to provide lift. To reduce drag, the plurality of variable-pitch primary blades 110 of the primary rotor 108 can be adjusted to 0-degrees and, in certain aspects, secured in place to prevent rotation about the fixed axis of rotation 168.

At step 714, in preparation for landing, each of the plurality of tiltable secondary rotor assemblies 114 is tilted from the horizontal configuration 200a to the vertical configuration 200b to transition the aircraft 100 from the cruise configuration 300c back to the hover configuration 300a. Step 714 is, in effect, the substantially similar to step 710, but in reverse order.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. It will be appreciated that the methods and systems described above are set forth by way of example and not of limitation. Numerous variations, additions, omissions, and other modifications will be apparent to one of ordinary skill in the art.

What is claimed is:

1. A method of operating an aircraft having an airframe, a forward wing set, an aft wing set, and a processor, the method comprising:
   controlling operation of a primary rotor, via the processor, to provide lift to the airframe during a hover phase, wherein the primary rotor comprises a plurality of synchronous variable-pitch primary blades radially coupled to a primary rotor hub; and controlling each of a plurality of tiltable secondary rotor assemblies, via the processor, to at least partially unload the primary rotor during the hover phase, each of the plurality of tiltable secondary rotor assemblies configured to be disposed on the forward wing set or the aft wing set, wherein the plurality of tiltable secondary rotor assemblies comprises starboard-side tiltable secondary rotor assemblies and port-side tiltable secondary rotor assemblies, wherein each of the plurality of tiltable secondary rotor assemblies is configured to pivot between a vertical configuration and a horizontal configuration as a function of an airspeed of the aircraft to transition the aircraft from a hover configuration to a cruise configuration, wherein a first tilt angle of the starboard-side tiltable secondary rotor assemblies is different than a second tilt angle of the port-side tiltable secondary rotor assemblies during a transition phase between the hover configuration and the cruise configuration.

2. The method of claim 1, further comprising the step of independently controlling each of the plurality of tiltable secondary rotor assemblies to provide counter-yaw-torque and pitch balance to the aircraft during the hover phase.

3. The method of claim 1, further comprising the step of pivoting each of the plurality of tiltable secondary rotor assemblies as a function of its position relative to the primary rotor.

4. The method of claim 1, wherein the secondary rotor of each of the plurality of tiltable secondary rotor assemblies is a variable-pitch rotor, the method further comprising the step of independently adjusting a blade pitch of each of the plurality of tiltable secondary rotor assemblies to achieve a desired thrust.

5. The method of claim 1, further comprising the step of pivoting controlling each of the plurality of tiltable secondary rotor assemblies to provide pitch and roll control.

6. The method of claim 5, wherein, in the hover configuration, (1) at least one of the plurality of tiltable secondary rotor assemblies is oriented to direct thrust downward and forward and (2) at least one of the plurality of tiltable secondary rotor assemblies is oriented to direct thrust downward and aft.

7. An aircraft comprising:
an airframe and a drivetrain coupled to the airframe;
a primary rotor coupled to the drivetrain and oriented to generate a vertical thrust relative to the airframe, wherein the primary rotor comprises a plurality of synchronous variable-pitch primary blades;
a forward wing set and an aft wing set; and
a plurality of tiltable secondary rotor assemblies comprising starboard-side tiltable secondary rotor assemblies and port-side tiltable secondary rotor assemblies disposed on the forward wing set and the aft wing set,
wherein a processor is configured to control each of the plurality of tiltable secondary rotor assemblies to tilt between a vertical configuration and a horizontal configuration as a function of an airspeed of the aircraft, wherein a first tilt angle of the starboard-side tiltable secondary rotor assemblies is different than a second tilt angle of the port-side tiltable secondary rotor assemblies during a transition phase between the vertical configuration and the horizontal configuration.

8. The aircraft of claim 7, wherein the plurality of synchronous variable-pitch primary blades provide collective-only control to the primary rotor.

9. The aircraft of claim 7, wherein at least an outboard wing portion of each of the forward wing set and the aft wing set is configured to pivot relative to the airframe to tilt its respective tiltable secondary rotor assembly between the vertical configuration and the horizontal configuration.

10. The aircraft of claim 7, wherein each of the plurality of tiltable secondary rotor assemblies is arranged in the vertical configuration during a hover phase and configured to partially unload the primary rotor.

11. The aircraft of claim 10, wherein the tiltable secondary rotor assemblies are configured to provide pitch and roll control during the hover phase.

12. The aircraft of claim 10, wherein the tiltable secondary rotor assemblies are configured to provide counter-yaw-torque and pitch and roll balance to the aircraft during the hover phase.

13. The aircraft of claim 10, wherein, during the hover phase, (1) at least one of the plurality of tiltable secondary rotor assemblies is oriented to direct thrust downward and forward and (2) at least one of the plurality of tiltable secondary rotor assemblies is oriented to direct thrust downward and aft.

14. The aircraft of claim 7, wherein each of the plurality of tiltable secondary rotor assemblies is arranged in the horizontal configuration during a cruise phase.

15. The aircraft of claim 14, wherein a pitch angle of the plurality of synchronous variable-pitch primary blades is adjusted to 0-degrees during the cruise phase.

16. The aircraft of claim 15, further comprises a primary pitch actuator to adjust the pitch angle of the plurality of synchronous variable-pitch primary blades.

17. The aircraft of claim 7, wherein the secondary rotor of each of the plurality of tiltable secondary rotor assemblies is a variable-pitch rotor.

18. The aircraft of claim 17, wherein each variable-pitch rotor of the plurality of tiltable secondary rotor assemblies is independently controllable.

19. A propulsion system for an aircraft, the propulsion system comprising:
a primary rotor configured to couple to a drivetrain and oriented to generate a vertical thrust relative to an airframe, wherein the primary rotor comprises a plurality of synchronous variable pitch primary blades;
a plurality of wing-tilt mechanisms, each of the plurality of wing-tilt mechanisms having a tilt actuator;
a plurality of tiltable secondary rotor assemblies comprising starboard-side tiltable secondary rotor assemblies and port-side tiltable secondary rotor assemblies and configured to be disposed about the primary rotor,
wherein a processor is configured to control each of the plurality of tiltable secondary rotor assemblies to tilt via one of the plurality of wing-tilt mechanisms between a vertical configuration and a horizontal configuration as a function of an airspeed of the aircraft, wherein a first tilt angle of the starboard-side tiltable secondary rotor assemblies is different than a second tilt angle of the port-side tiltable secondary rotor assemblies during a transition phase between the vertical configuration and the horizontal configuration; and
an electric generator or an engine configured to generate power necessary to drive either the primary rotor or the plurality of tiltable secondary rotor assemblies.

20. The propulsion system of claim 19, wherein the tiltable secondary rotor assemblies are configured to provide pitch and roll control during a hover phase.

* * * * *